United States Patent
Izumi et al.

(10) Patent No.: US 8,049,367 B2
(45) Date of Patent: Nov. 1, 2011

(54) POWER SUPPLY SYSTEM, VEHICLE WITH THE POWER SUPPLY SYSTEM AND POWER SUPPLY SYSTEM CONTROL METHOD

(75) Inventors: Junta Izumi, Toyota (JP); Kiyohito Machida, Aichi-ken (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 12/506,294

(22) Filed: Jul. 21, 2009

(65) Prior Publication Data

US 2010/0019569 A1    Jan. 28, 2010

(30) Foreign Application Priority Data

Jul. 28, 2008    (JP) .................................. 2008-193790

(51) Int. Cl.
*H02J 7/00* (2006.01)
*H02J 9/00* (2006.01)
(52) U.S. Cl. ........................................ 307/66; 307/10.7
(58) Field of Classification Search .................. None
See application file for complete search history.

(56) References Cited

U.S. PATENT DOCUMENTS

| | | | | |
|---|---|---|---|---|
| 5,522,034 A | * | 5/1996 | Watari et al. ..................... | 714/22 |
| 5,677,604 A | * | 10/1997 | Masaki et al. ................. | 318/139 |
| 2005/0116686 A1 | * | 6/2005 | Odaohhara ..................... | 320/116 |
| 2005/0285571 A1 | * | 12/2005 | Grunert et al. ................. | 320/128 |

FOREIGN PATENT DOCUMENTS

| | | | |
|---|---|---|---|
| JP | 2005168103 A | | 6/2005 |
| JP | 2006211800 | * | 8/2006 |
| JP | 2007206764 A | | 8/2007 |
| JP | 2008109840 A | | 5/2008 |

* cited by examiner

*Primary Examiner* — Rexford Barnie
*Assistant Examiner* — Justen Fauth
(74) *Attorney, Agent, or Firm* — Gifford, Krass, Sprinkle, Anderson & Citkowski, P.C.

(57) ABSTRACT

When a vehicle is set to a travel control mode or external charging mode, a vehicle system is activated for executing the control mode to which the vehicle is set. A converter ECU selects one sub power storage unit to be used first after activation of the vehicle system, based on a power storage unit used after preceding activation as read from a memory unit contained in the converter ECU and based on respective states of charge of sub power storage units, and electrically connects the selected sub power storage unit and a converter via a switch circuit. When the vehicle system is activated for executing the travel control mode, the converter ECU updates information about the power storage unit used after preceding activation as stored in the memory unit, to information about the power storage unit used first after the present activation of the vehicle system. When the vehicle system has been activated for executing the external charging mode, the converter ECU maintains the information about power storage used after the preceding activation as stored in the memory.

13 Claims, 10 Drawing Sheets

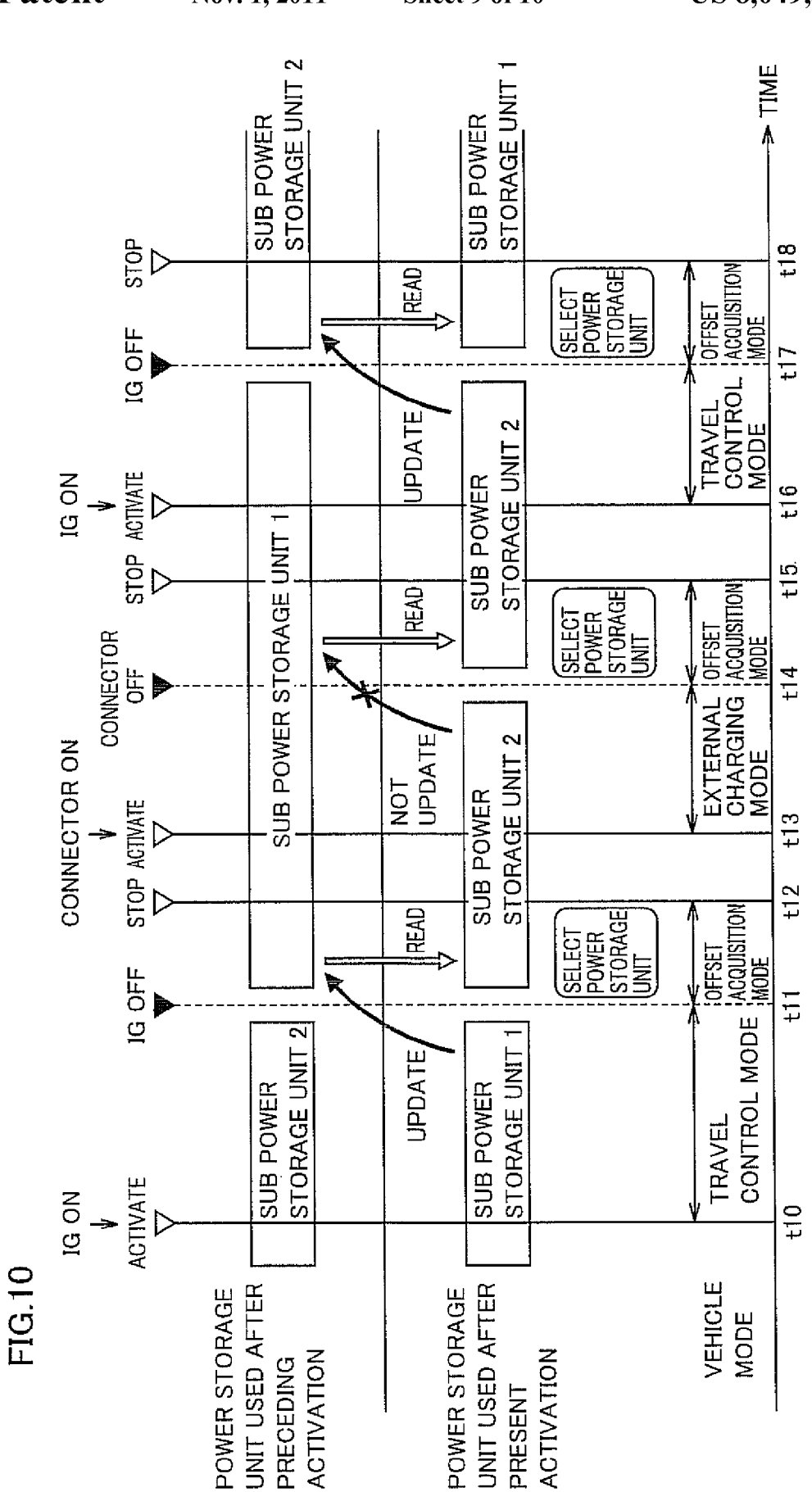

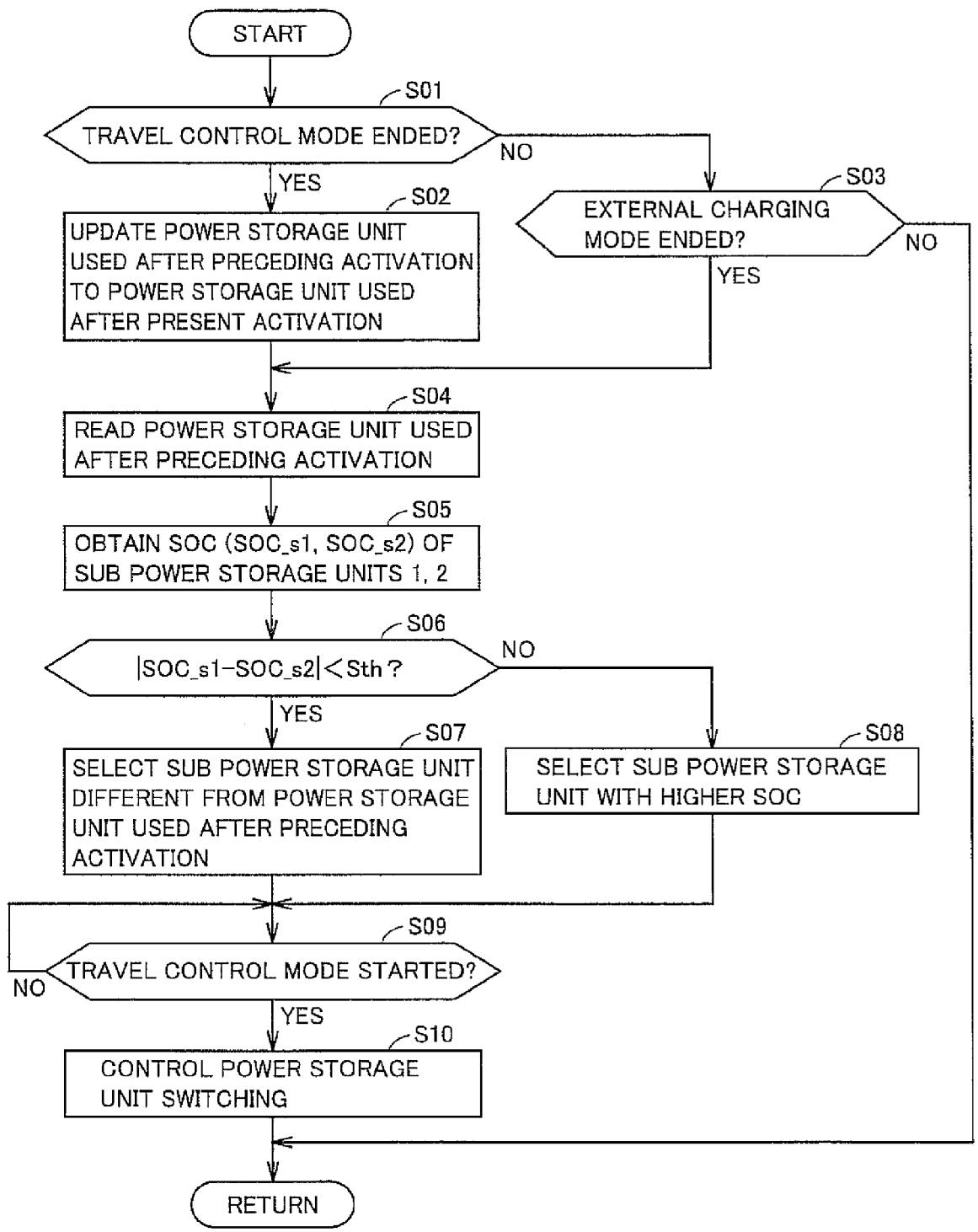

POWER SUPPLY SYSTEM, VEHICLE WITH THE POWER SUPPLY SYSTEM AND POWER SUPPLY SYSTEM CONTROL METHOD

This nonprovisional application is based on Japanese Patent Application No. 2008-193790 filed on Jul. 28, 2008 with the Japan Patent Office, the entire contents of which are hereby incorporated by reference.

BACKGROUND OF THE INVENTION

1. Field of the Invention

The present invention relates to a power supply system provided with a plurality of chargeable and dischargeable power storage units, and a vehicle including the power supply system, as well as a control method for the power supply system.

2. Description of the Background Art

The recent interest in environmental issues has drawn people's attention to vehicles having an electric motor as a source of drive force, such as electric vehicle, hybrid vehicle, fuel cell vehicle and the like. Such vehicles are mounted with a power storage unit formed of a secondary battery or electrical double layer capacitor for supplying electric power to the electric motor, or converting kinetic energy generated when regenerative braking is applied into electrical energy for storing the resultant electric power.

For such a vehicle having an electric motor as a source of drive force, it is desirable to increase the charge and discharge capacities of the power storage unit for the purpose of improving the travel performance such as acceleration performance and continuous travel distance, for example. A configuration including a plurality of power storage units has been proposed as a method for increasing the charge and discharge capacities of the power storage units.

Japanese Patent Laying-Open No. 2008-109840 for example discloses a vehicle mounted with a power supply system including: a plurality of power storage units connected in parallel with each other relative to one converter; and a plurality of system main relays provided in association with these power storage units for electrically connecting/disconnecting the associated power storage units and the converter to/from each other, respectively. According to the disclosure, a control device for controlling the converter controls the operation of these system main relays such that the power storage units are used in a specified order and the order of use is changed each time the vehicle system is activated.

Regarding the vehicle having an electric motor as a source of drive force, it has been proposed to electrically connect a power storage unit mounted on the vehicle via a connector to an external power supply such as commercial power supply, such that the power storage unit can be charged by the external power supply. The vehicle in which the power storage unit is thus charged in advance by the external power supply can travel with the internal combustion engine kept stopped, as long as the distance over which the vehicle travels is relatively short, in such cases as commuting or shopping. Accordingly, the overall fuel consumption efficiency can be improved. This charging of the power storage unit by an external power supply is also referred to as "external charging mode," relative to "travel control mode" for causing the vehicle to travel.

Regarding the vehicle using a plurality of power storage units charged by an external power supply, if the power storage unit to be used first is changed each time the vehicle system is activated as disclosed in the above-referenced Japanese Patent Laying-Open No. 2008-109840, it cannot be ensured that a sub power storage unit used first in the preceding execution of the travel control mode is different from a sub power storage unit to be used first in the current execution of the travel control mode, since the vehicle system is activated each time the travel control mode is performed and the external charging mode is performed. Accordingly, there is a possibility that a specific power storage unit is always used first each time the travel control mode is executed, while the remaining power storage units with a high SOC are left as they are for the period in which the specific power storage unit is used.

The rate of deterioration of the power storage unit considerably varies depending to the environment in which the power storage unit is used. The rate of deterioration of the power storage unit is higher when the power storage unit keeps a high SOC than when the power storage unit is being charged or discharged. In this case, therefore, the rate of deterioration of the remaining power storage units with the SOC kept high is accelerated. A resultant problem is that respective degrees of deterioration of the power storage units are different from each other.

SUMMARY OF THE INVENTION

An object of the present invention is to provide a power supply system with which a difference in degree of deterioration between a plurality of power storage units can be suppressed, and provide a vehicle provided with the power supply system and a method for controlling the power supply system.

According to an aspect of the present invention, a power supply system for supplying electric power to a load device includes: a power storage mechanism configured to be chargeable and dischargeable; and a control device configured to activate the power supply system for executing one of a first control mode and a second control mode when the power supply system is set to the one of the first control mode and the second control mode, the first control mode being executed for supplying and receiving electric power between the power storage mechanism and the load device, and the second control mode being executed for externally charging the power storage mechanism with electric power received from an external power supply. The power storage mechanism includes a plurality of power storage units each being chargeable and dischargeable and connected in parallel to the load device. The control device includes: a memory unit for storing a history of use of the plurality of power storage units; and a power storage unit selection unit for selecting, from the plurality of power storage units, a power storage unit to be used first after activation of the power supply system, based on the history of use of the plurality of power storage units. The power storage unit selection unit reads from the memory unit information about a power storage unit used first after preceding activation of the power supply system and, based on the read information, selects a power storage unit to be used first after present activation of the power supply system. The control device further includes an update unit configured to update, when the power supply system has been activated for executing the first control mode, the information about the power storage unit used first after the preceding activation of the power supply system as stored in the memory unit, to information about a power storage unit used first after the present activation of the power supply system, and to maintain, when the power supply system has been activated for executing the second control mode, the information about the power storage unit used first after the preceding activation of the power supply system as stored in the memory unit.

Preferably, the control device further includes a state estimation unit for estimating a value of state of charge of each of the plurality of power storage units. Based on the history of use of the plurality of power storage units and the value of state of charge of the plurality of power storage units, the power storage unit selection unit selects, from the plurality of power storage units, the power storage unit to be used first after the present activation of the power supply system.

Preferably, when a difference between respective values of state of charge of the plurality of power storage units is larger than a predetermined value, the power storage unit selection unit selects a power storage unit having a largest value of state of charge as the power storage unit to be used first after the present activation of the power supply system and, when the difference is not larger than the predetermined value, the power storage unit selection unit selects a power storage unit different from the power storage unit used first after the preceding activation of the power supply system, as the power storage unit to be used first after the present activation of the power supply system.

Preferably, the power storage unit selection unit selects the power storage unit to be used first after the present activation of the power supply system, after the preceding activation of the power supply system and when execution of the control mode to which the power supply system is set is ended.

Preferably, the power supply system further includes: an electric power line configured to allow electric power to be supplied and received between the load device and the power supply system; and a voltage conversion unit provided between the power storage mechanism and the electric power line for making voltage conversion between the power storage mechanism and the electric power line. The control device further includes a voltage conversion control unit configured to control the voltage conversion by the voltage conversion unit such that electric power is supplied and received between the power storage mechanism and the load device or the external power supply according to the control mode to which the power supply system is set.

Preferably, the power storage mechanism further includes a switch mechanism for selecting one of the plurality of power storage units and connecting the selected power storage unit to the load device. The control device further includes a power storage unit switch unit for controlling the switch mechanism such that the power storage unit selected by the power storage unit selection unit and the load device are electrically connected.

According to another aspect of the present invention, a vehicle includes any power supply system as described above, and a drive force generation unit configured as the load device to generate drive force for the vehicle from electric power received from the power storage mechanism.

According to still another aspect of the present invention, a control method for a power supply system for supplying electric power to a load device is provided. The power supply system has a power storage mechanism including a plurality of power storage units each being chargeable and dischargeable and connected in parallel to the load device. The control method includes the steps of: setting the power supply system to one of a first control mode and a second control mode, and activating the power supply system for executing the one of the first control mode and the second control mode to which the power supply system is set, the first control mode being executed for supplying and receiving electric power between the power storage mechanism and the load device, and the second control mode being executed for externally charging the power storage mechanism with electric power received from an external power supply; storing a history of use of the plurality of power storage units in a memory unit; and selecting, from the plurality of power storage units, a power storage unit to be used first after activation of the power supply system, based on the history of use of the plurality of power storage units. The step of selecting one power storage unit includes reading from the memory unit information about a power storage unit used first after preceding activation of the power supply system and, based on the read information selecting a power storage unit to be used first after present activation of the power supply system. The control method further includes the step of updating, when the power supply system has been activated for executing the first control mode, the information about the power storage unit used first after the preceding activation of the power supply system, as stored in the memory unit to information about a power storage unit used first after the present activation of the power supply system as stored in the memory unit, and maintaining, when the power supply system has been activated for executing the second control mode, the information about the power storage unit used first after the preceding activation of the power supply system as stored in the memory unit.

Preferably, the control method further includes the step of estimating a value of state of charge of each of the plurality of power storage units. In the step of selecting one power storage unit, based on the history of use of the plurality of power storage units and the value of state of charge of the plurality of power storage units each, the power storage unit to be used first after activation of the power supply system is selected from the plurality of power storage units.

Preferably, in the step of selecting one power storage unit, when a difference between respective values of state of charge of the plurality of power storage units is larger than a predetermined value, a power storage unit having a largest value of state of charge is selected as the power storage unit to be used first after the present activation of the power supply system and, when the difference is not larger than the predetermined value, a power storage unit different from the power storage unit used first after the preceding activation of the power supply system is selected as the power storage unit to be used first after the present activation of the power supply system.

Preferably, in the step of selecting one power storage unit, the power storage unit to be used first after the present activation of the power supply system is selected after the preceding activation of the power supply system and when execution of the control mode to which the power supply system is set is ended.

Preferably, the power supply system includes: an electric power line configured to allow electric power to be supplied and received between the load device and the power supply system; and a voltage conversion unit provided between the power storage mechanism and the electric power line for making voltage conversion between the power storage mechanism and the electric power line. The control method further includes the step of controlling the voltage conversion by the voltage conversion unit such that electric power is supplied and received between the power storage mechanism and the load device or the external power supply according to the control mode to which the power supply system is set.

Preferably, the power storage mechanism further includes a switch mechanism for selecting one of the plurality of power storage units and connecting the selected power storage unit to the load device. The control method further includes the step of controlling the switch mechanism such that the power storage unit selected by the step of selecting one power storage unit and the load device are electrically connected.

In accordance with the present invention, a difference in degree of deterioration between a plurality of power storage units provided in a power supply system can be suppressed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 10 is a diagram for illustrating a concept regarding control of switching between sub power storage units 6-1, 6-2 to be used, according to an embodiment of the present invention.

FIG. 11 is a flowchart for illustrating a control structure of the power storage unit switching unit in the converter ECU of FIG. 5.

DESCRIPTION OF THE PREFERRED EMBODIMENTS

Figure 1:
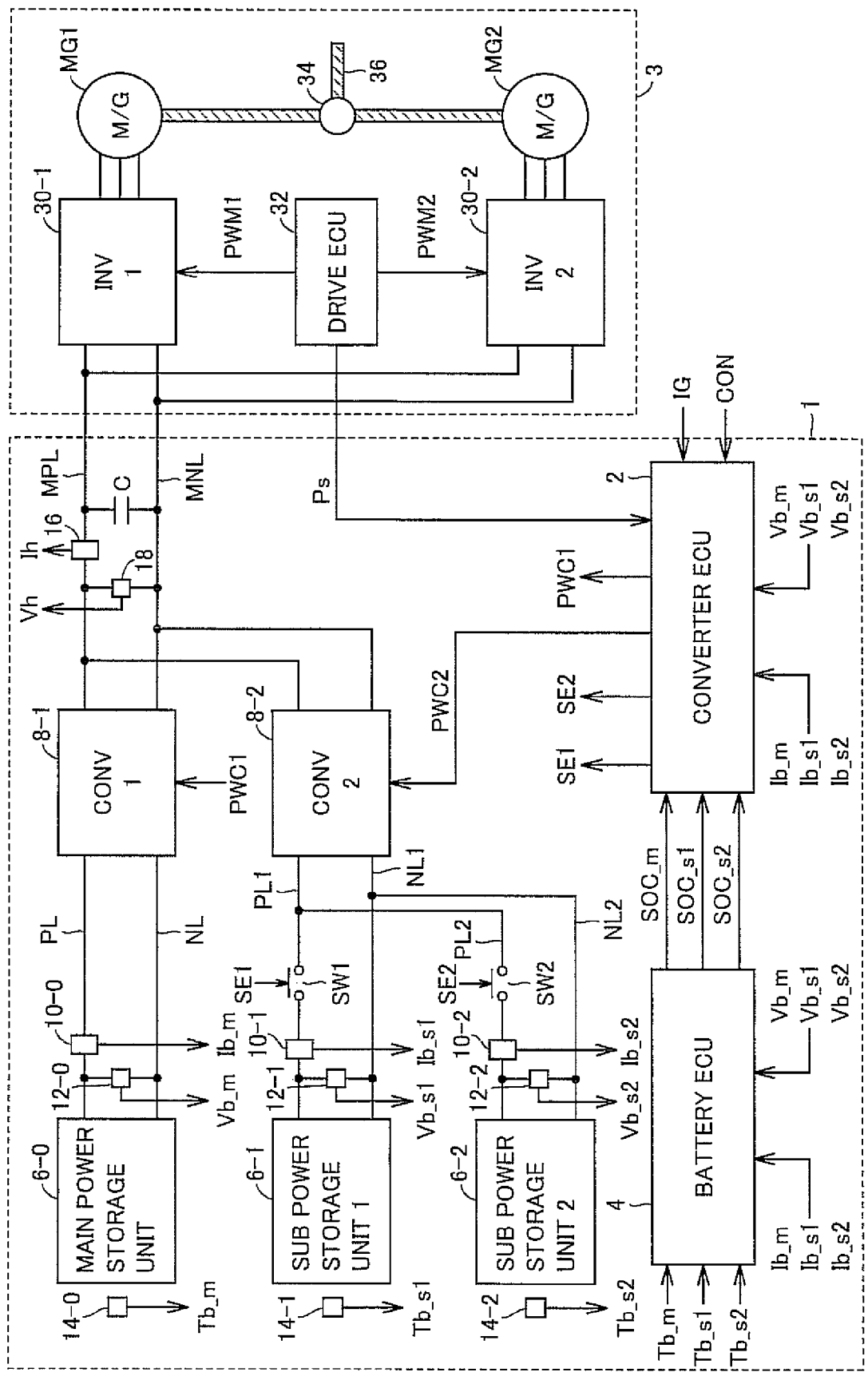
FIG. 1 is a schematic configuration diagram showing a substantial portion of a vehicle provided with a power supply system according to an embodiment of the present invention.

Embodiments of the present invention will be hereinafter described in detail with reference to the drawings. In the drawings, like reference characters represent like or corresponding components.

FIG. 1 is a schematic configuration diagram showing a substantial portion of a vehicle provided with a power supply system 1 according to an embodiment of the present invention.

Referring to FIG. 1, the present embodiment will be described to illustrate the case where a drive force generation unit 3 for generating drive force for the vehicle is a load device. The vehicle travels using the drive force generated from electric power supplied from power supply system 1 to drive force generation unit 3, and transmitted to wheels (not shown). Further, while regenerative braking is applied, the vehicle uses drive force generation unit 3 to generate electric power from the kinetic energy and collect the electric power in power supply system 1.

The present embodiment will also be described to illustrate power supply system 1 including three power storage units as a plurality of power storage units. Power supply system 1 supplies and receives DC (direct current) power to and from drive force generation unit 3 via a main positive line MPL and a main negative line MNL. In the following description, the electric power supplied from power supply system 1 to drive force generation unit 3 will also be referred to as "drive electric power" and the electric power supplied from drive force generation unit 3 to power supply system 1 will also be referred to as "regenerative electric power."

Drive force generation unit 3 includes a first inverter (INV1) 30-1, a second inverter (INV2) 30-2, a first motor generator MG1, a second motor generator MG2, and a drive ECU (Electronic Control Unit) 32.

Inverters 30-1, 30-2 are connected in parallel to main positive line MPL and main negative line NPL, for supplying and receiving electric power to and from power supply system 1. Specifically, inverters 30-1, 30-2 convert drive electric power (DC power) as received via main positive line MPL and main negative line MNL into AC (alternating current) power to supply the AC power to motor generator MG1, MG2, and convert AC power generated by motor generators MG1, MG2 into DC power to supply the DC power as regenerative electric power to power supply system 1. By way of example, inverters 30-1, 30-2 are each constituted of a bridge circuit including switching devices for three phases, and perform switching operation (open/close the circuit) according to switching commands PWM1, PWM2 received from drive ECU 32 to generate three-phase AC power.

Motor generators MG1, MG2 are configured to be able to generate rotational drive force from AC power as supplied from inverters 30-1, 30-2, respectively, and to be able to generate electric power from externally supplied rotational drive force. By way of example, motor generators MG1, MG2 are each a three-phase AC rotating electric machine including a rotor in which a permanent magnet is embedded. Motor generators MG1, MG2 are connected to a power transmission mechanism 34 to transmit the generated drive force to wheels (not shown) by a driveshaft 36.

In the case where drive force generation unit 3 is applied to a hybrid vehicle, motor generators MG1, MG2 are also coupled to an engine (not shown) via power transmission mechanism 34 or driveshaft 36. Drive ECU 32 then performs control in such a manner that an optimum ratio between the drive force generated by the engine and the drive force generated by motor generators MG1, MG2 is achieved. Where applied to a hybrid vehicle as described above, motor generator MG1 may also be operated exclusively as an electric generator while motor generator MG2 may also be operated exclusively as an electric motor.

Drive ECU 32 executes a program stored in advance to calculate drive electric power (also referred to as requested electric power hereinafter) Ps requested by drive force generation unit 3 for power supply system 1, based on signals transmitted respectively from sensors (not shown), travel conditions, rate of change of the accelerator pedal position, and a map as stored, for example, and calculate a target value of the torque and a target value of the rotational speed of motor generators MG1, MG2, based on the calculated requested electric power Ps. Then, drive ECU 32 generates switching commands PWM1, PWM2 to control inverters 30-1, 30-2, in such a manner that the generated torque and the rotational speed of motor generators MG1, MG2 are equal to the target torque value and the target rotational speed value. Further, drive ECU 32 outputs the calculated requested electric power Ps to power supply system 1.

<Configuration of Power Supply System>

Power supply system 1 includes a smoothing capacitor C, an input/output current detection unit 16, an input/output voltage detection unit 18, a first converter (CONV1) 8-1, a second converter (CONV2) 8-2, a main power storage unit 6-0, a first sub power storage unit 6-1, a second sub power storage unit 6-2, a first switch circuit SW1, a second switch circuit SW2, charge/discharge current detection units 10-0, 10-1, 10-2, charge/discharge voltage detection units 12-0, 12-1, 12-2, temperature detection units 14-0, 14-1, 14-2, a converter ECU 2, and a battery ECU 4.

Smoothing capacitor C is connected between main positive line MPL and main negative line MNL to reduce a fluctuation component included in the drive electric power that is output from converters 8-1, 8-2 and the regenerative electric power supplied from drive force generation unit 3.

Input/output current detection unit 16 is connected between main positive line MPL and main negative line MNL for detecting input/output current value Ih of the drive electric power and the regenerative electric power supplied and received to and from drive force generation unit 3, and outputs the result of detection to converter ECU 2.

Input/output voltage detection unit 18 is connected between main positive line MPL and main negative line MNL for detecting input/output voltage value Vh of the drive electric power and the regenerative electric power supplied and received to and from drive force generation unit 3, and outputs the result of detection to converter ECU 2.

Converter 8-1 is provided between main positive and negative lines MPL, MNL and main power storage unit 6-0, for performing electric power conversion between main power storage unit 6-0 and main positive and negative lines MPL, MNL. Specifically, converter 8-1 steps up the discharge electric power from main storage unit 6-0 to a predetermined voltage to supply the resultant voltage as drive electric power, and steps down the regenerative electric power from drive force generation unit 3 to a predetermined voltage to charge main storage unit 6-0.

Converter 8-2 is provided between main positive and negative lines MPL, MNL and sub power storage units 6-1, 6-2, for performing electric power conversion between one of sub power storage units 6-1, 6-2 connected selectively via switch circuits SW1, SW2 and the main positive and negative lines. Specifically, converter 8-2 steps up the discharge electric power from one of sub power storage units 6-1, 6-2 to a predetermined voltage to supply the resultant voltage as drive electric power, and steps down the regenerative electric power supplied from drive force generation unit 3 to charge the sub power storage unit. By way of example, converters 8-1, 8-2 are each constituted of a chopper circuit.

Main power storage unit 6-0 is connected in parallel to main positive line MPL and main negative line MNL via converter 8-1. Sub power storage unit 6-1 is connected in parallel to main positive line MPL and main negative line MNL via converter 8-2. Sub power storage unit 6-2 is connected in parallel to sub power storage unit 6-1 with respect to converter 8-2. Main power storage unit 6-0 and sub power storage units 6-1, 6-2 are each formed of a secondary battery configured to be chargeable and dischargeable, such as nickel-metal hydride battery or lithium-ion battery, or electrical double layer capacitor.

In power supply system 1 according to the present embodiment, main power storage unit 6-0 and sub power storage units 6-1, 6-2 have a master-subordinate relationship, in supplying and receiving electric power to and from main positive line MPL and main negative line MNL. Specifically, main power storage unit 6-0 is configured to serve as a source from which electric power is supplied to drive force generation unit 3 and auxiliaries such as ECU, and regularly supply and receive the electric power to and from main positive line MPL and main negative line MNL. In contrast, sub power storage units 6-1, 6-2 are configured to constitute "sub power storage device" for assisting main power storage unit 6-0, by temporarily supplying and receiving the electric power to and from main positive line MPL and main negative line MNL when an associated switch circuit is rendered electrically conductive.

More specifically, switch circuits SW1, SW2 are provided between converter 8-2 and sub power storage units 6-1, 6-2, respectively, to electrically connect or disconnect an associated sub power storage unit and converter 8-2 to or from each other in response to signals SE2, SE2 from converter ECU 2. By way of example, switch circuits SW1, SW2 are each formed of an open/close switch including a power semiconductor device having a control electrode or formed of a relay having a mechanical contact. In response to respective signals SE1, SE2 form converter ECU 2, switch circuits SW1, SW2 are made electrically conductive or non-conductive to selectively make a switch between the state where only switch circuit SW1 is rendered conductive, the state where only switch circuit SW2 is rendered conductive, and the state where both of switch circuits SW1, SW2 are rendered non-conductive. The electrical conduction and non-conduction of switch circuits SW1, SW2 are controlled according to the control of switching between sub power storage units 6-1, 6-2 to be used, as described hereinlater.

Charge/discharge current detection unit 10-0 is provided at one electric power line PL connecting main power storage unit 6-0 and converter 8-1, for detecting charge/discharge current value Ib_m which is used in charging/discharging main power storage unit 6-0, to output the result of detection to battery ECU 4 and converter ECU 2.

Charge/discharge current detection units 10-1, 10-2 are provided at respective electric lines PL1, PL2 for connecting sub power storage units 6-1, 6-2 and converter 8-2, for detecting charge/discharge current values Ib_s1, Ib_s2, respectively, used in charging/discharging sub power storage units 6-1, 6-2, to output the result of detection to battery ECU 4 and converter ECU 2.

Charge/discharge voltage detection unit 12-0 is connected between electric power lines PL, NL that connect main power storage unit 6-0 and converter 8-1, for detecting charge/discharge voltage value Vb_m of main power storage unit 6-0, to output the result of detection to battery ECU 4 and converter ECU 2.

Charge/discharge voltage detection units 12-1, 12-2 are connected between electric power lines that connect sub power storage units 6-1, 6-2 and converter 8-2, respectively, for detecting charge/discharge voltage values Vb_s1, Vb_s2, to output the result of detection to battery ECU 4 and converter ECU 2.

Temperature detection units 14-0, 14-1, 14-2 are disposed in the vicinity of battery cells or the like that are constituent elements of main power storage unit 6-0 and sub power storage units 6-1, 6-2, respectively, for detecting power storage unit temperatures Tb_m, Tb_s1, Tb_s2 that are respective internal temperatures of main power storage unit 6-0 and sub power storage units 6-1, 6-2, to output the result of detection to battery ECU 4. Here, temperature detection units 14-0, 14-1, 14-2 may be configured to output a representative value determined by averaging or the like based on respective results of detection by a plurality of detection elements disposed in association with a plurality of battery cells forming main power storage unit 6-0 and sub power storage units 6-1, 6-2.

Battery ECU 4 calculates respective states of charge (SOC), namely SOC_m, SOC_s1, SOC_s2 of main power storage unit 6-0 and sub power storage units 6-1, 6-2, respectively, based on charge/discharge current values Ib_m, Ib_s1, Ib_s2 received from charge/discharge current detection units 10-0, 10-1, 10-2, charge/discharge voltage values Vb_m, Vb_s1, Vb_s2 received from charge/discharge voltage detection units 12-0, 12-1, 12-2, and battery temperatures Tb_m, Tb_s1, Tb_s2 received from temperature detection units 14-0, 14-1, 14-2.

Any of various well-known techniques may be used for calculating SOC of main power storage unit 6-0 and sub power storage units 6-1, 6-2. While SOC may be represented by the absolute value (unit: [A·h] for example) of the amount of charge of the power storage unit, SOC is herein represented by the ratio (0 to 100%) of the remaining amount of electric power with respect to the power storage capacity of the power storage unit. Battery ECU 4 outputs the calculated SOC (SOC_m, SOC_s1, SOC_s2) of main power storage unit 6-0 and sub power storage units 6-1, 6-2 to converter ECU 2.

Converter ECU 2 generates switching commands PWC1, PWC2 following a control structure as described below, based on input/output current value Ih received from input/output current detection unit 16, input/output voltage value Vh received from input/output voltage detection unit 18, charge/discharge current values Ib_m, Ib_s1, Ib_s2 received from charge/discharge current detection units 10-0, 10-1, 10-2, charge/discharge voltage values V_m, Vb_s1, Vb_s2 received from charge/discharge voltage detection units 12-0, 12-1, 12-2, SOC_m, SOC_s1, SOC_s2 received from battery ECU 4, and requested electric power Ps received from drive ECU 32, and accordingly controls converters 8-1, 8-2. The control structure of converter ECU 2 will be described in detail hereinlater.

Figure 2:
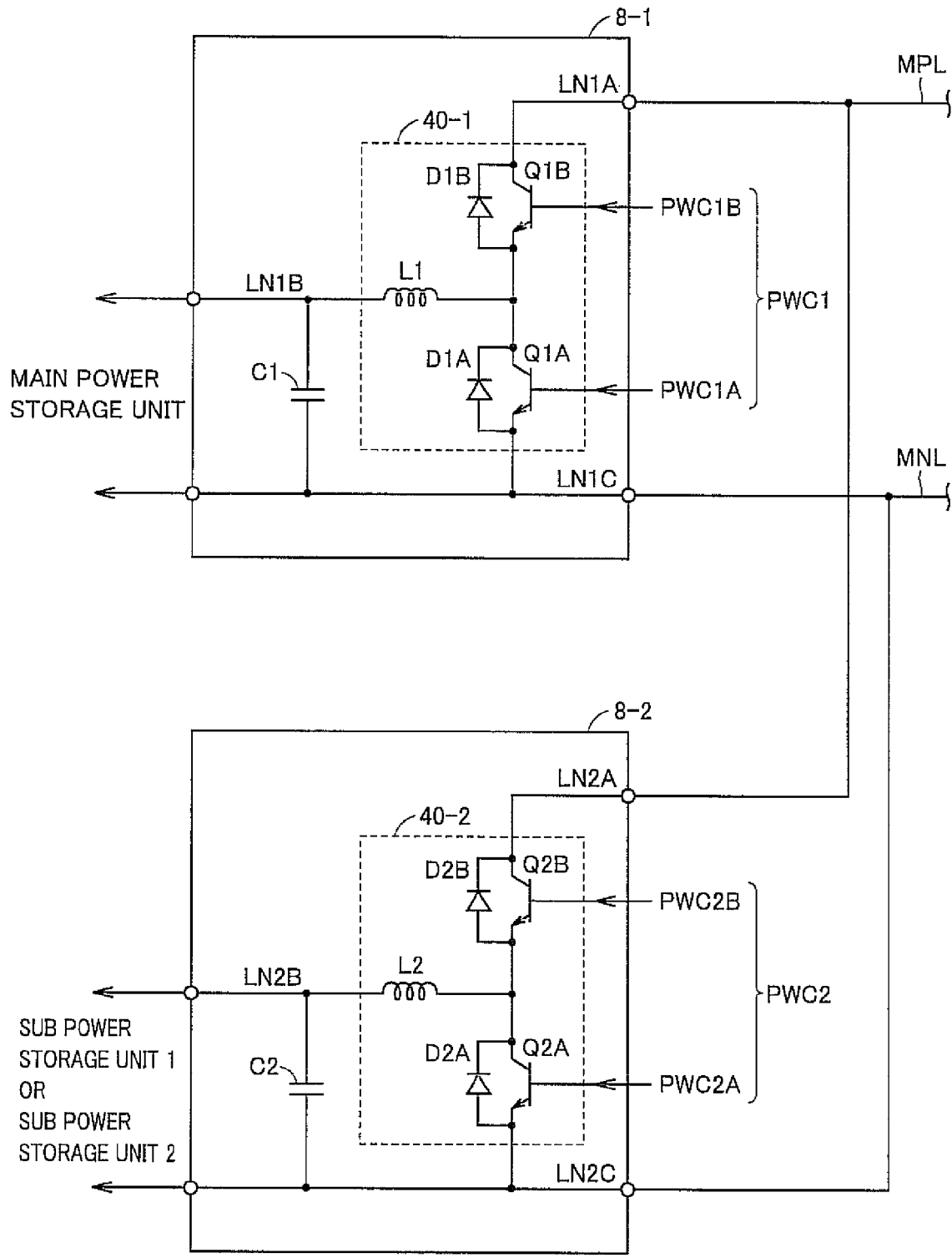
FIG. 2 is a schematic configuration diagram of converters according to an embodiment of the present invention.

FIG. 2 is a schematic configuration diagram of converters 8-1, 8-2 according to an embodiment of the present invention.

Referring to FIG. 2, converter 8-1 is constituted to include a chopper circuit 40-1 and a smoothing capacitor C1.

Chopper circuit 40-1 steps up DC power (drive electric power) received from main power storage unit 6-0 in discharging, and steps down DC power (regenerative electric power) received from main positive line MPL and main negative line MNL for charging, in response to switching command PWC from converter ECU 2 (FIG. 1). Chopper circuit 40-1 includes positive line LN1A, negative line LN1C, line LN1B, transistors Q1A, Q1B that are switching elements, diodes D1A, D1B, and an inductor L1.

Positive line LN1A has one end connected to the collector of transistor Q1B and the other end connected to main positive line MPL. Negative line LN1C has one end connected to the negative side of main power storage unit 6-0 and the other end connected to main negative line MNL.

Transistors Q1A and Q1B are connected in series between negative line LN1C and positive line LN1A. The emitter of transistor Q1A is connected to negative line LN1C, while the collector of transistor Q1B is connected to positive line LN1A. Further, diodes D1A, D1B for allowing the current to flow from the emitter side to the collector side are connected between respective collectors and respective emitters of transistors Q1A, Q1B. Furthermore, inductor L1 is connected to the point of connection between transistor Q1A and transistor Q1B.

Line LN1B has one end connected to the positive side of main power storage unit 6-0 and the other end connected inductor L1.

Smoothing capacitor C1 is connected between line LN1B and negative line LN1C for reducing an AC component included in the DC voltage between line LN1B and negative line LN1C.

In the following, a voltage converting operation (voltage step-up operation and voltage step-down operation) of converter 8-1 will be described. In the voltage step-up operation, converter ECU 2 (FIG. 1) keeps transistor Q1B off and causes transistor Q1A to turn on and off at a predetermined duty ratio. In the ON period of transistor Q1A, discharge current flows from main power storage unit 6-0 via line LN1B, inductor L1, diode D1B and positive line LN1A in this order to main positive line MPL. At the same time, pumping current flows from main power storage unit 6-0 via line LN1B, inductor L1, transistor Q1A, and negative line LN1C in this order. Inductor L1 uses this pumping current to store electromagnetic energy. Then, as transistor Q1A is changed from the ON state to the OFF state, inductor L1 superimposes the stored electromagnetic energy on the discharge current. Accordingly, the average voltage of the DC power supplied from converter 8-1 to main positive line MPL and main negative line MNL is stepped up by a voltage corresponding to the electromagnetic energy stored in inductor L1 according to the duty ratio.

In the voltage step-down operation, converter ECU2 turns on and off transistor Q1B at a predetermined duty ratio and keeps transistor Q1A off. In the ON period of transistor Q1B, charge current flows from main positive line MPL via positive line LN1A, transistor Q1B, inductor L1 and line LN1B to main power storage unit 6-0. Subsequently, as transistor Q1B is changed from the ON state to the OFF state, inductor L1 generates a magnetic flux to interfere with a change of the current, so that the charge current continues flowing via diode D1A, inductor L1 and line LN1B in this order. In terms of the electric energy, DC power is supplied via main positive line MPL and main negative line MNL in only the ON period of transistor Q1B. Therefore, supposing that the charge current is kept constant (the inductance of inductor L1 is sufficiently large), the average voltage of the DC power supplied from converter 8-1 to main power storage unit 6-0 is the product of the DC voltage between main positive line MPL and main negative line MNL and the duty ratio.

In order to control the voltage converting operation of converter 8-1 as described above, converter ECU 2 generates switching command PWC1 including switching command PWC1A for controlling ON and OFF of transistor Q1A, and switching command PWC1B for controlling ON and OFF of transistor Q1B.

Since the configuration and operation of converter 8-2 are similar to those of converter 8-1 as described above, the detailed description thereof will not be repeated.

<Control Structure>

In the following, the control structure of converter ECU 2 will be described in more detail. Converter ECU 2 controls electric power sharing between main power storage unit 6-0 and sub power storage units 6-1, 6-2 according to the concept illustrated in FIGS. 3 and 4.

Figure 3:
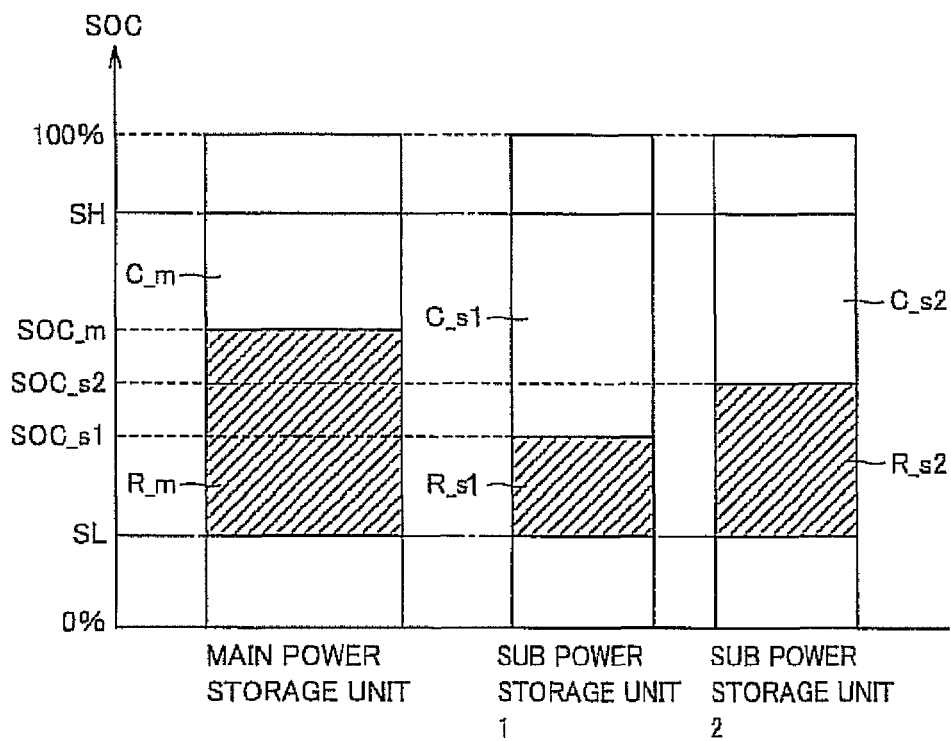
FIG. 3 is a diagram for illustrating control of electric power sharing between a main power storage unit and sub power storage units.

FIG. 3 is a diagram for illustrating control of electric power sharing between main power storage unit 6-0 and sub power storage units 6-1, 6-2.

Referring to FIG. 3, main power storage unit 6-0 and sub power storage units 6-1, 6-2 have respective upper limits SH and lower limits SL of SOC, and the allowable electric power (allowable charge electric power Win and allowable discharge electric power Wout) is restricted so that SOC is kept within an appropriate range defined by upper limit SH and lower limit SL. Specifically, where SOC of a power storage unit becomes smaller than lower limit SL, allowable discharge electric power Wout for this power storage unit is restricted. On the contrary, where SOC of the power storage unit becomes higher than upper limit SH, allowable charge electric power Win for this power storage unit is restricted.

Here, allowable charge electric power Win and allowable discharge electric power Wout are respectively short-term limit values for the charge electric power and the discharge electric power that are defined by limitations in chemical reaction. The allowable charge electric power and the allowable discharge electric power as well as SOC with respect to which the allowable electric power is restricted vary depending on the characteristics of the power storage unit. It is supposed here that respective SOCs with respect to which the allowable electric power for main power storage unit 6-0 and sub power storage units 6-1, 6-2 is restricted are substantially equal to each other.

It is supposed that respective SOCs of main power storage unit 6-0 and sub power storage units 6-1, 6-2 are SOC_m, SOC_s1, SOC_s2 and electric power (drive electric power) is supplied from power supply system 1 to drive force generation unit 3. Regarding sub power storage units 6-1, 6-2, it is supposed that sub power storage units 6-1, 6-2 together constitute a sub power storage device, since one of the sub power storage units is connected by above-described switch circuits SW1, SW2 to converter 8-2.

If main power storage unit 6-0 and the sub power storage device are equally discharged ("equally discharged" here may include the case where respective amounts of electric power discharged from the power storage unit and device are equal to each other, and the case where respective decreases in SOC of the power storage unit and device are equal to each other), allowable discharge electric power Wout for one of main power storage unit 6-0 and the sub power storage device that has its SOC becoming smaller than lower limit SL is restricted first before the allowable discharge electric power for the other power storage unit or device is restricted. After this, regardless of the fact that the other power storage unit or device still has a sufficient dischargeable capacity, the dischargeable capacity of power supply system 1 as a whole that is the sum of respective dischargeable capacities of main power storage unit 6-0 and the sub power storage device decreases.

Accordingly, in the present embodiment, the discharge power share ratio between main power storage unit 6-0 and the sub power storage device is calculated such that respective SOCs of main power storage unit 6-0 and the sub power storage device simultaneously reach lower limit SL. Then, according to the calculated discharge power share ratio, main power storage unit 6-0 and the sub power storage device are discharged. In this way, the opportunity (period of time) to effect the maximum dischargeable capacity of power supply system 1 as a whole can be maximized.

Specifically, the discharge power share ratio is calculated based on respective remaining amounts of electric power in main power storage unit 6-0 and the sub power storage device. Remaining electric power amount R_m of main power storage unit 6-0 before SOC_m reaches lower limit SL with respect to which allowable discharge electric power Wout_m is restricted is calculated with the following formula:

$$R\_m = A\_m \times (SOC\_m - SL) \qquad (1)$$

where A_m represents the power storage capacity of main power storage unit 6-0.

The remaining electric power amount of the sub power storage device is the sum of respective remaining electric power amounts of sub power storage units 6-1, 6-2. Remaining electric power amount R_s1 of sub power storage unit 6-1 before SOC_s1 reaches lower limit SL, with respect to which allowable discharge electric power Wout_s1 is restricted, is calculated using formula (2). Further, remaining electric power amount R_s2 of sub power storage unit 6-2 before SOC_s2 reaches lower limit SL, with respect to which allowable discharge electric power Wout_s2 is restricted, is calculated using formula (3).

$$R\_s1 = A\_s1 \times (SOC\_s1 - SL) \qquad (2)$$

$$R\_s2 = A\_s2 \times (SOC\_s2 - SL) \qquad (3)$$

In the formulas, A_s1 represents the power storage capacity of sub power storage unit 6-1 and A_s2 represents the power storage capacity of sub power storage unit 6-2.

Further from formulas (2), (3), remaining electric power amount R_s of the sub power storage device before respective SOCs of sub power storage units 6-1, 6-2 reach lower limit SL is calculated.

$$R\_s = R\_s1 + R\_s2 \qquad (4)$$

In the case where electric power is supplied from power supply system 1 to drive force generation unit 3, electric power is discharged from main power storage unit 6-0 and the sub power storage device such that the share ratio of the discharge electric power from main power storage unit 6-0 and the sub power storage device is R_m:R_s.

Figure 4:
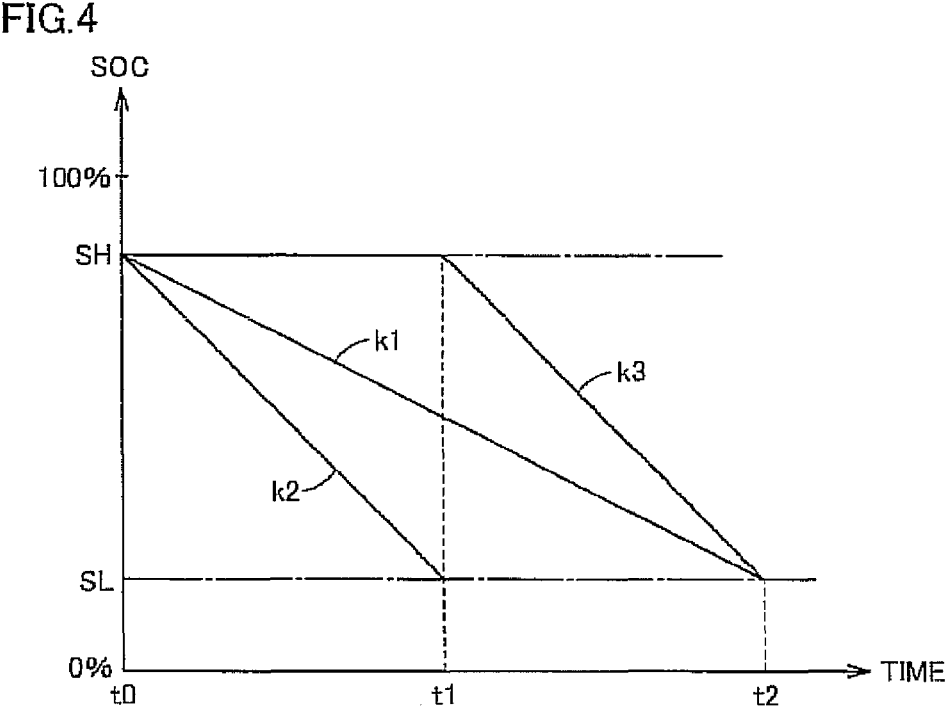
FIG. 4 is a diagram showing an example of respective changes in SOC of the main power storage unit and the sub power storage units.

FIG. 4 is a diagram showing an example of respective changes in SOC of main power storage unit 6-0 and sub power storage units 6-1, 6-2. Regarding FIG. 4 as well, it is supposed that main power storage unit 6-0 and sub power storage units 6-1, 6-2 have the same upper limit SH and lower limit SL of SOC.

Referring to FIG. 4, line k1 represents a change in SOC of main power storage unit 6-0 while lines k2, k3 represent respective changes in SOC of sub power storage units 6-1, 6-2. At time t0, discharge of main power storage unit 6-0 and the sub power storage device is started. Then, discharge power share ratio between main power storage unit 6-0 and the sub power storage device is calculated based on formulas (1) to (4) above, such that respective SOCs of main power storage unit 6-0 and the sub power storage device simultaneously reach lower limit SL at time t2.

Regarding the sub power storage device, sub power storage unit 6-1 is discharged from time t0 to time t2. At this time, converter ECU 2 causes switch circuit SW1 to be electrically conductive and causes switch circuit SW2 to be electrically non-conductive. At time t1, SOC of sub power storage unit 6-1 reaches lower limit SL, and accordingly converter ECU 2 causes switch circuit SW1 to be electrically non-conductive and causes switch circuit SW2 to be electrically conductive. Accordingly, after time t1, sub power storage unit 6-2 is discharged. Then, at time t2, main power storage unit 6-0 and sub power storage unit 6-2 both reach lower limit SL.

Figure 5:
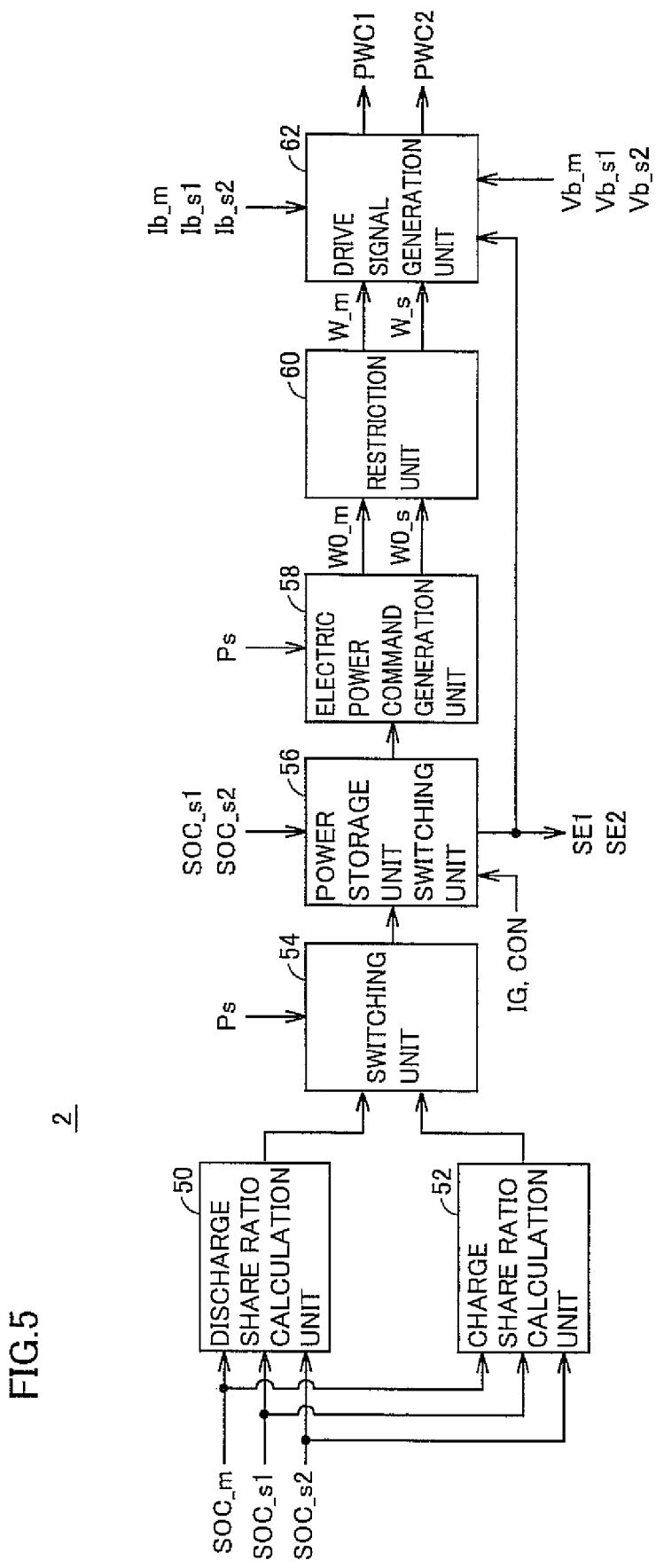
FIG. 5 is a block diagram for illustrating a control structure of a converter ECU.

FIG. 5 is a block diagram for illustrating a control structure of converter ECU 2.

Referring to FIG. 5, converter ECU 2 includes a discharge share ratio calculation unit 50, a charge share ratio calculation unit 52, a switching unit 54, a power storage unit switching unit 56, an electric power command generation unit 58, a restriction unit 60, and a drive signal generation unit 62.

Discharge share ratio calculation unit 50 receives from battery ECU 4 (FIG. 1) SOC (SOC_m, SOC_s1, SOC_s2) of main power storage unit 6-0 and sub power storage units 6-1, 6-2, and uses above-described formulas (1) to (4) to calculate remaining electric power amounts R_m, R_s of main power storage unit 6-0 and the sub power storage device (sub power storage unit 6-1 and sub power storage unit 6-2). Discharge ratio calculation unit 50 then outputs to switching unit 54 discharge electric power share ratio R_m:R_s according to the ratio between calculated remaining electric power amounts R_m, R_s.

Charge share ratio calculation unit 52 receives from battery ECU 4 respective SOCs of main power storage unit 6-0 and sub power storage units 6-1, 6-2, and calculates respective chargeable amounts C_m, C_s of main power storage unit 6-0 and the sub power storage device before SOC of main power storage unit 6-0 and the sub power storage device reaches upper limit SH.

Here, referring to FIG. 4, chargeable amount C_m of main power storage unit 6-0 and chargeable amount C_s of the sub power storage device are calculated using formulas (5) to (8):

$$C\_m = A\_m \times (SH - SOC\_m) \quad (5)$$

$$C\_s1 = A\_s1 \times (SH - SOC\_s1) \quad (6)$$

$$C\_s2 = A\_s2 \times (SH - SOC\_s2) \quad (7)$$

$$C\_s = C\_s1 + C\_s2 \quad (8)$$

where C_s1 represents a chargeable amount of sub power storage unit 6-1 before SOC_s1 of sub power storage unit 6-1 reaches upper limit SH, and C_s2 represents a chargeable amount of sub power storage unit 6-2 before SOC_s2 of sub power storage unit 6-2 reaches upper limit SH.

Then, charge share ratio calculation unit 52 outputs to switching unit 54 charge power share ratio C_m:C_s according to the ratio between calculated chargeable amounts C_m, C_s.

When requested electric power Ps received from drive ECU 32 of drive force generation unit 3 (FIG. 1) is a positive value, namely when electric power is to be supplied from power supply system 1 to drive force generation unit 3, switching unit 54 outputs discharge power share ratio R_m:R_s received from discharge share ratio calculation unit 50, to power storage unit switching unit 56 and electric power command generation unit 58. On the contrary, when requested electric power Ps received from drive ECU 32 is a negative value, namely when electric power is to be supplied from drive force generation unit 3 to power supply system 1, switching unit 54 outputs charge power share ratio C_m:C_s received from charge share ratio calculation unit 52, to power storage unit switching unit 56 and electric power command generation unit 58.

Based on SOC_s1, SOC_s2 of sub power storage units 6-1, 6-2, power storage unit switching unit 56 makes a switch between sub power storage unit 6-1 and sub power storage unit 6-2 to be used. Specifically, in the case where sub power storage unit 6-1 is used while sub power storage unit 6-2 is not used, power storage unit switching unit 56 generates signal SE1 for making switch circuit SW1 electrically conductive and signal SE2 for making switch circuit SW2 electrically non-conductive, and outputs the generated signals to switch circuits SW1, SW2, respectively. In contrast, when sub power storage unit 6-1 is not used while sub power storage unit 6-2 is used, power storage unit switching unit 56 generates signal SE1 for making switch circuit SW1 electrically nonconductive and signal SE2 for making switch circuit SW2 electrically conductive, and outputs the generated signals to switch circuit SW1, SW2, respectively. Further, power storage unit switching unit 56 outputs generated signals SE1, SE2 to electric power command generation unit 58 and drive signal generation unit 62.

Regarding the switch of sub power storage units 6-1, 6-2 to be used, it is supposed here that sub power storage units 6-1, 6-2 are used in turn as shown in FIG. 4. In this case, each time the vehicle system is activated, power storage unit switching unit 56 follows a method as described below to select one sub power storage unit to be used first after the vehicle system is activated, from sub power storage units 6-1, 6-2.

When requested electric power Ps received from drive ECU 32 is a positive value, electric power command generation unit 58 uses the following formulas to calculate electric power command values W0_m, W0_s for main power storage unit 6-0 and the sub power storage device, based on discharge power share ratio R_m:R_s received from switching unit 54.

$$W0\_m = Ps \times R\_m / (R\_m + R\_s) \quad (9)$$

$$W0\_s = Ps \times R\_s / (R\_m + R\_s) \quad (10)$$

On the contrary, when requested electric power Ps received from drive ECU 32 is a negative value, electric power command generation unit 58 uses the following formulas to calculate electric power command values W0_m, W0_s for main power storage unit 6-0 and the sub power storage device, based on charge power share ratio C_m:C_s received from switching unit 54.

$$W0\_m = Ps \times C\_m / (C\_m + C\_s) \quad (11)$$

$$W0\_s = Ps \times C\_s / (C\_m + C\_s) \quad (12)$$

Restriction unit 60 restricts electric power command value W0_m for main power storage unit 6-0, which is calculated by electric power command generation unit 58, within the range of allowable charge electric power Win_m and allowable discharge electric power Wout_m, and outputs the command as electric power command value W_m. Further, restriction unit 60 restricts electric power command value W0_s for the sub power storage device, which is calculated by electric power command generation unit 58, within the range of allowable charge electric powers Win_s1, Win_s2 and allowable discharge electric powers Wout_s1, Wout_s2 for sub power storage units 6-1, 6-2, and outputs the command as electric power command value W_s. At this time, restriction unit 60 identifies the sub power storage unit which is being used, based on signals SE1, SE2 that are output from power storage unit switching unit 56, and restricts electric power command value W0_s for the sub power storage device within the range of allowable charge electric power Win_s1 (or Win_s2) and allowable discharge electric power Wout_s1 (or Wout_s2) for the identified sub power storage unit.

In the case where one of electric power command values W0_m, W0_s is restricted and the other electric power command value has some margin with respect to the allowable electric power, restriction unit 60 applies the portion beyond the limit to the other electric power command value.

Drive signal generation unit 62 receives electric power command values W_m, W_s from restriction unit 60, receives charge/discharge current values Ib_m, Ib_s1, Ib_s2 from charge/discharge current detection units 10-0, 10-1, 10-2, charge/discharge voltage values Vb_m, Vb_s1, Vb_s2 from charge/discharge voltage detection units 12-0, 12-1, 12-2, and receives signals SE1, SE2 from power storage unit switching unit 56, and then generates switching commands PWC1, PWC2 according to the control structure described hereinlater so as to control converters 8-2, 8-2.

Figure 6:
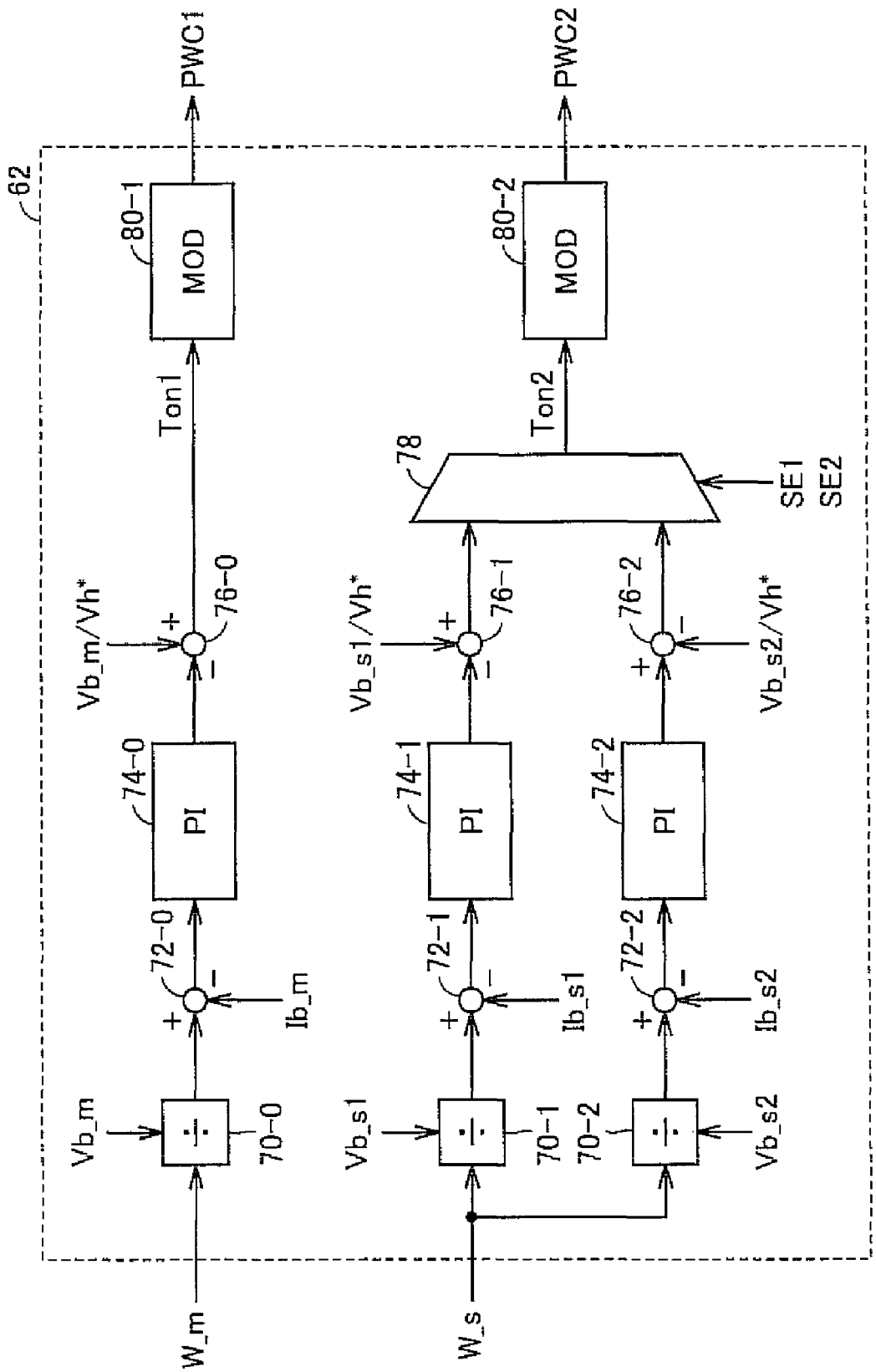
FIG. 6 is a block diagram for illustrating a detailed control structure of a drive signal generation unit in the converter ECU of FIG. 5.

FIG. 6 is a block diagram for illustrating a detailed control structure of drive signal generation unit 62 in converter ECU 2 of FIG. 5.

Referring to FIG. 6, drive signal generation unit 62 includes division units 70-0, 70-1, 70-2, subtraction units 72-0, 72-1, 72-2, 76-0, 76-1, 76-2, proportional control units (PI) 74-0, 74-1, 74-2, a selection unit 78, and modulation units (MOD) 80-1, 80-2.

Division unit 70-0 divides electric power command value W_m by charge/discharge voltage value Vb_m of main power storage unit 6-0 to determine a target value (target current value) Ib_m* of charge/discharge electric current Ib_m for main power storage unit 6-0.

Subtraction unit 72-0 calculates an electric current deviation from the difference between target current value Ib_m* and charge/discharge current value Ib_m of main power storage unit 6-0, and outputs the deviation to proportional control unit (PI) 74-0. Proportional control unit 74-0 is configured to include at least a proportional element (P) and an integral element (I) to output an operation signal according to the input current deviation to subtraction unit 76-0.

Subtraction unit 76-0 inverts the operation signal output from proportional control unit 74-0, adds, to the signal, charge/discharge voltage value Vb_m/target voltage value Vh* (inverse of theoretical voltage step up ratio for converter 8-1), so as to output duty command (voltage control mode) Ton1. This duty command Ton1 is a control command defining the on duty of transistor Q1A (FIG. 2) of converter 8-1.

Modulation unit 80-1 compares a carrier wave generated by an oscillator (not shown) with duty command Ton1 to generate switching command PWC 1 (PWC1A, PWC1B) for controlling converter 8-1.

Division unit 70-1 divides electric power command value W_s by charge/discharge voltage value Vb_s1 of sub power storage unit 6-1 to determine a target value (target current value) Ib_s1* of charge/discharge current value Ib_s1 for sub power storage unit 6-1.

Subtraction unit 72-1 calculates an electric current deviation from the difference between target current value Ib_s1* and charge/discharge current value Ib_s1 of sub power storage unit 6-1, and outputs the deviation to proportional control unit (PI) 74-1. Proportional control unit 74-1 outputs an operation signal according to the input current deviation to subtraction unit 76-1.

Subtraction unit 76-1 inverts the operation signal output from proportional control unit 74-1, adds, to the signal, charge/discharge voltage value Vb_s1/target voltage value Vh* (inverse of theoretical voltage step up ratio for converter 8-2), so as to output duty command (voltage control mode) #Ton2. This duty command #Ton2 is a control command defining the on duty of transistor Q2A (FIG. 2) of converter 8-2 in the case where sub power storage unit 6-1 is connected to converter 8-2.

Division unit 70-2 divides electric power command value W_s by charge/discharge voltage value Vb_s2 of sub power storage unit 6-2 to determine a target value (target current value) Ib_s2* of charge/discharge electric current Ib_s2 for sub power storage unit 6-2.

Subtraction unit 72-2 calculates an electric current deviation from the difference between target current value Ib_s2* and charge/discharge current value Ib_s2 of sub power storage unit 6-2, and outputs the deviation to proportional control unit (PI) 74-2. Proportional control unit 74-2 outputs an operation signal according to the input current deviation to subtraction unit 76-2.

Subtraction unit 76-2 inverts the operation signal output from proportional control unit 74-2, adds, to the signal, charge/discharge voltage value Vb_s2/target voltage value Vh* (inverse of theoretical voltage step up ratio for converter 8-2), so as to output duty command (voltage control mode) % Ton2. This duty command % Ton2 is a control command defining the on duty of transistor Q2A (FIG. 2) of converter 8-2 in the case where sub power storage unit 6-2 is connected to converter 8-2.

Selection unit 78 receives duty command (sub power storage unit 6-1) #Ton 2 and duty command (sub power storage unit 6-2) % Ton2, and then selects one of them based on signals SE1, SE2 from power storage unit switching unit 56 (FIG. 5) to output the selected one as duty command Ton2 to modulation unit 80-2. Specifically, in the case where signal SE1 is H (logical high) and signal SE2 is L (logical low), selection unit 78 selects duty command #Ton2 to output the selected command to modulation unit 80-2. In the case where signal SE1 is L level and signal SE2 is H level, selection unit 78 selects duty command % Ton2 to output the selected command to modulation unit 80-2.

Modulation unit 80-2 compares the carrier wave generated by an oscillator (not shown) and duty command Ton2 to generate switching command PWC2 (PWC2A, PWC2B) for controlling converter 8-2.

As described above, converter ECU 2 determines the electric power share ratio based on the remaining electric power amounts and the chargeable amounts of main power storage unit 6-0 and the sub power storage device (sub power storage units 6-1, 6-2), and generates switching commands PWC1, PWC2 for controlling the voltage conversion by converter 8-1, 8-2, according to the determined electric power share ratio. At this time, as the remaining electric power amount and the chargeable amount of the sub power storage device, the sum of respective remaining electric power amounts of sub power storage units 6-1, 6-2 and the sum of respective chargeable amounts of sub power storage units 6-1, 6-2 are calculated, respectively. Thus, when the allowable electric power of one of main power storage unit 6-0 and the sub power storage device is restricted, resultant restriction of the charge/discharge capacity of the other power storage unit or device can be suppressed. Accordingly, the maximum performance of power supply system 1 as a whole can be exhibited.

As for the switch of sub power storage units 6-1, 6-2 to be used that constitute the sub power storage device, if sub power storage unit 6-1 is used first and then sub power storage unit 6-2 is used after SOC_s1 of sub power storage unit 6-1 reaches lower limit SL as shown in FIG. 4, a problem arises that respective degrees of deterioration of sub power storage units 6-1, 6-2 are different from each other. In this case, it is difficult to achieve desired performance of power supply system 1 as a whole.

Specifically, the degree of deterioration of a power storage unit considerably varies depending on the environment in which the power storage unit is used. For example, when the power storage unit is charged, the chemical reaction causes reaction heat to be generated, so that the temperature of the power storage unit increases. The increase in temperature of the power storage unit results in degradation in performance of the power storage unit. In particular, excessive charging could be a cause of acceleration of the deterioration of the power storage unit. Therefore, if the power storage unit with a high SOC is left as it is for a long period of time, the degree of deterioration of the power storage unit significantly increases.

Such deterioration in performance of the power storage unit will be considered in terms of the switch of sub power storage units 6-1, 6-2 to be used as shown in FIG. 4. In the period from time t0 to time t1, sub power storage unit 6-1 is used, and thus sub power storage unit 6-2 with a high SOC (upper limit SH for example) is left as it is. The degree of deterioration of sub power storage unit 6-2 is thus higher than that of sub power storage unit 6-1. This is remarkably seen in a travel pattern where travel of a relatively short distance per trip is repeated. Specifically, each time the vehicle system is activated, sub power storage unit 6-1 is always used first, and one trip comes to the end before SOC of power storage unit 6-1 becomes smaller than lower limit SL, namely before sub power storage unit 6-2 is used, and thus sub power storage unit 6-2 with a high SOC is left as it is for a long period of time.

Recently, a vehicle has been proposed having a power storage unit mounted thereon, where the power storage unit is electrically connected to an external power supply such as commercial power supply via a connector so as to allow the power storage unit to be charged by the external power supply. In the following, "travel control mode" refers to the mode where the travel of the vehicle is controlled such that the ratio between the drive force generated by the engine and the drive force generated by motor generators MG1, MG2 is an optimum ratio, while "external charging mode" refers to the mode where the power storage unit is charged by an external power supply as describe above.

Figure 7:
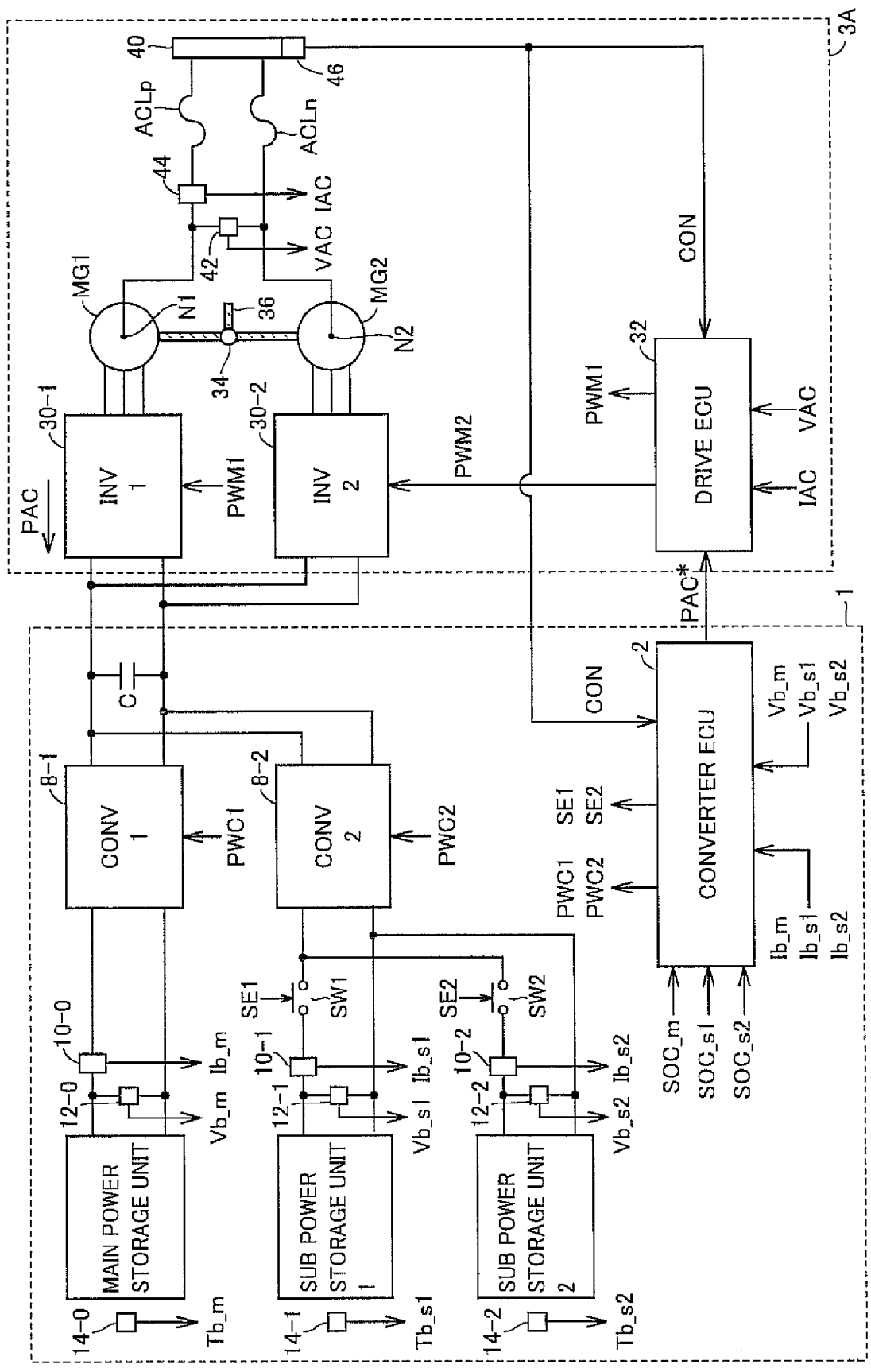
FIG. 7 is a schematic configuration diagram showing a substantial portion of a vehicle provided with a power supply system having an external charging mode.

FIG. 7 is a schematic configuration diagram showing a substantial portion of a vehicle provided with a power supply system 1 having the external charging mode.

Referring to FIG. 7, the vehicle includes power supply system 1 and a drive force generation unit 3A. Drive force generation unit 3A additionally includes elements for externally charging main power storage unit 6-0 and sub power storage units 6-1, 6-2, as compared with drive force generation unit 3 shown in FIG. 1.

Drive force generation unit 3A includes, as the elements for externally charging main power storage unit 6-0 and sub power storage units 6-1, 6-2, a supply line ACL, a charge connector 40, a supply voltage detection unit 42, a supply current detection unit 44, and a coupling detection sensor 46 for detecting whether or not an external power supply and charge connector 40 are coupled.

In the case where the power storage unit is externally charged, the vehicle is connected by charge connector 40 to an external power supply (not shown) via a positive supply line ACLp and a negative supply line ACLn, so that the electric power from the external power supply is fed to power supply system 1. As the external power supply, a single-phase AC commercial power supply for example is used.

Positive supply line ACLp and negative supply line ACLn are connected to a neutral point N1 of a motor generator MG1 and a neutral point N2 of motor generator MG2, respectively. Supply voltage detection unit 42 is connected between positive supply line ACLp and negative supply line ACLn for detecting supply voltage VAC from the external power supply and outputting the detected value to drive ECU 32. Supply current detection unit 44 is provided at positive supply line ACLp for detecting supply current IAC from the external power supply and outputting the detected value to drive ECU 32.

When coupling detection sensor 46 detects the state where the vehicle is connected by charge connector 40 to the external power supply (hereinafter also referred to as "connector ON state"), coupling detection sensor 46 outputs coupling signal CON indicating the result of detection to drive ECU 32 and converter ECU 2. While the vehicle system is stopped (hereinafter also referred to as "IG OFF state"), drive ECU 32 and converter ECU 2 receiving this coupling signal CON is activated, so that the vehicle system is activated.

Converter ECU 2 generates a switching command for a converter associated with a power storage unit to be charged. Converter ECU 2 further determines target supply electric power PAC* for the external power supply and outputs the target supply electric power to drive ECU 32.

Based on the given target supply electric power PAC*, drive ECU 32 generates switching commands PWM1, PWM2 for inverters 30-1, 30-2. Accordingly, electric power is supplied from the external power supply to the power storage unit to be charged.

Here, motor generators MG1, MG2 are each a three-phase AC rotating electric machine including a rotor with a permanent magnet embedded therein, as well as a stator where coils for three phases are Y-connected (star-connected). In the Y connection, the point where these coils are connected to each other corresponds to neutral points N1, N2 each of respective motor generators MG1, MG2.

As described above, inverters 30-1, 30-2 are each constituted of a bridge circuit including switching elements for three phases. Specifically, inverters 30-1, 30-2 each include three switching elements in an upper arm (positive side) and three switching elements in a lower arm (negative side). In the case where three-phase AC power is to be generated from inverters 30-1, 30-2, one of the switching elements in the upper arm and one of the switching elements in the lower arm are driven to the ON state at different times.

Alternatively, in each of the upper arm and the lower arm, the three switching elements may be collectively turned on/off. In such an operation mode, the three switching elements in the upper arm can be regarded as being in the same switching state (all switching elements are ON or OFF), while the three switching elements in the lower arm can also be regarded as being in the same switching state.

In this operation mode, respective phase voltages are equal to each other, and a zero voltage vector relative to the neutral point can be defined.

Figure 8:
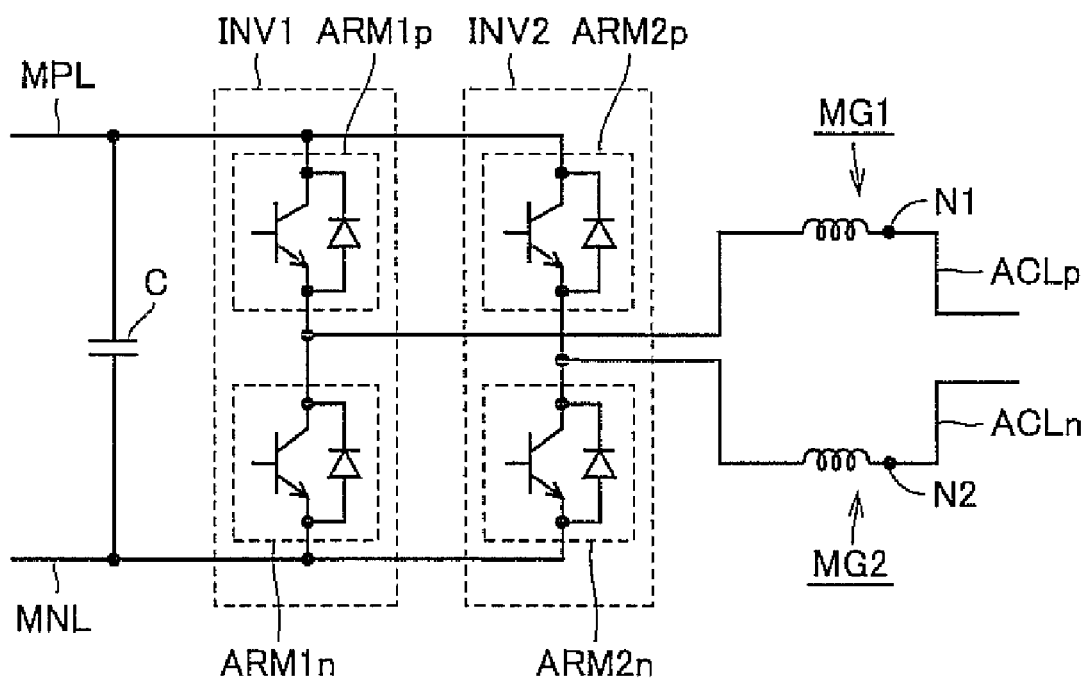
FIG. 8 is a zero-phase equivalent circuit diagram of inverters and motor generators in the case where a zero voltage vector is generated.

FIG. 8 is a zero phase equivalent circuit diagram of inverters 30-1, 30-2 and motor generators MG1, MG2 in the case where a zero voltage vector is generated.

Referring to FIG. 8, in the case where inverters 30-1, 30-2 performs an operation mode for generating a zero voltage vector as described above, the three switching elements in the upper arm of inverter 30-1 are collectively represented by an upper arm ARM1$p$, and the three switching elements in the lower arm of inverter 30-1 are collectively represented by a lower arm ARM1$n$. Similarly, the three switching elements in the upper arm of inverter 30-2 are collectively represented by an upper arm ARM2$p$ and the three switching elements in the lower arm of inverter 30-2 are collectively represented by a lower arm ARM2$n$.

The zero phase equivalent circuit shown in FIG. 8 can be regarded as a single-phase PWM inverter receiving AC commercial electric power as input that is supplied to neutral points N1, N2 via positive supply line ACLp and negative supply line ACLn. Accordingly, switching of inverters 30-1, 30-2 can be controlled such that inverters 30-1, 30-2 each operate as a phase arm of the single-phase PWM inverter, so as to allow the AC commercial electric power to be converted into DC electric power to be supplied to a power storage unit.

In accordance with the present embodiment, in addition to the effects derived from the embodiment of the present invention, the effect that the vehicle configuration can be simplified is achieved. A power supply system according to the present invention can thus be established at a low cost.

<Switch Control of Sub Power Storage Units to be Used>

For the vehicle having the external charging mode as shown in FIG. 7, the charge and discharge performance of each power storage unit can be enhanced by preliminarily charging main power storage unit 6-0 and sub power storage units 6-1, 6-2 by an external power supply after one trip is ended.

The fact that the sub power storage unit to be used is switched as described above, however, results in the high frequency of occurrence of the state where sub power storage unit 6-2 with a high SOC is left as it is while sub power storage unit 6-1 is used. Consequently, sub power storage unit 6-2 further deteriorates, resulting in the disadvantage that the difference between respective degrees of deterioration of the sub power storage units increases.

The difference between respective degrees of deterioration of the sub power storage units can be suppressed by changing the sub power storage unit to be used first, each time the vehicle system is activated. In the vehicle having the external charging mode, the vehicle system is activated in response to turn-on of the ignition switch in the normal travel control mode, while the vehicle system is activated in response to coupling of charge connector 40 (FIG. 7) to an external power supply in the external charging mode. Therefore, if the sub power storage unit to be used first is changed each time the vehicle system is activated, it cannot be ensured that the sub power storage unit used first for the preceding execution of the travel control mode is always different from the sub power storage unit to be used first for the present execution of the travel control mode. Accordingly, a specific sub power storage unit could be always used first each time the travel control mode is executed, and the other sub power storage unit degrades further. In this case, it is difficult to suppress the difference in degree of deterioration between the sub power storage units.

In view of this, the power supply system according to the present invention uses the control structure as illustrated below with reference to FIGS. 9 to 11 for power storage unit switching unit 56 in converter ECU 2, so as to surely suppress the difference in degree of deterioration between the sub power storage units.

Figure 9:
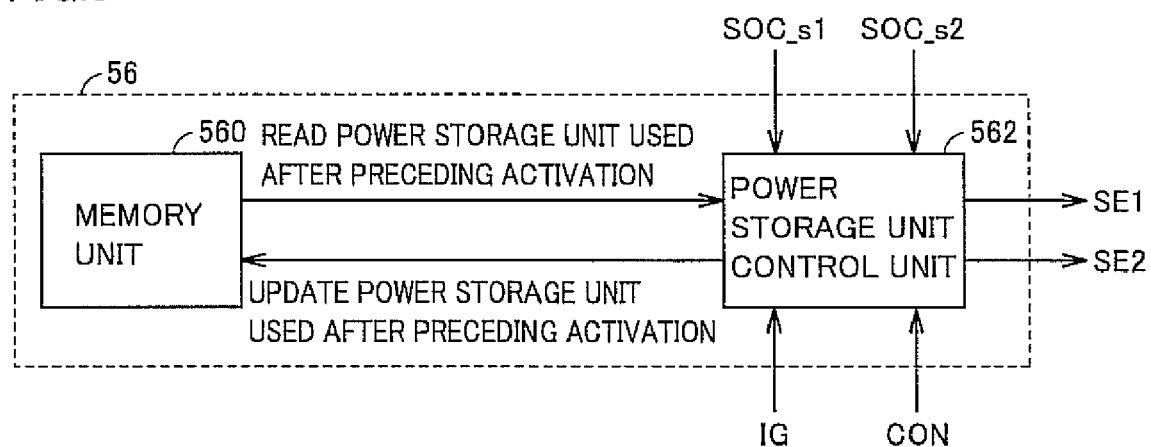
FIG. 9 is a block diagram for illustrating a detailed control structure of a power storage unit switching unit in the converter ECU of FIG. 5.

FIG. 9 is a block diagram for illustrating a detailed control structure of power storage unit switching unit 56 in converter ECU 2 of FIG. 5.

Referring to FIG. 9, power storage unit switching unit 56 includes a memory unit 560 and a power storage unit control unit 562.

Memory unit 560 is formed of a nonvolatile memory, and stores which sub power storage unit was used first after the preceding activation of the vehicle system (hereinafter also referred to as "power storage unit used after preceding activation").

Power storage unit control unit 562 reads from memory unit 560 the power storage unit used after preceding activation. Further, receiving from battery ECU 4 (FIG. 1) SOC (SOC_s1, SOC_s2) of sub power storage units 6-1, 6-2, power storage unit control unit 562 selects one of the sub power storage units that is to be used first after the present activation of the vehicle system (hereinafter also referred to as "power storage unit used after present activation"), based on the information a received.

Specifically, power storage unit control unit 562 selects, as the power storage unit used after present activation, a sub power storage unit that is different from the power storage unit used after preceding activation. In the case for example where the sub power storage device is constituted of two sub power storage units as in the present embodiment, sub power storage unit 6-2 is selected as the power storage unit used after present activation, if the power storage unit used after preceding activation is sub power storage unit 6-1 and, if the power storage unit used after preceding activation is sub power storage unit 6-2, sub power storage unit 6-1 is selected as the power storage unit used after present activation.

At this time, power storage unit control unit 562 further calculates a difference $\Delta SOC(=|SOC\_s1-SOC\_s2|)$ between respective SOCs of sub power storage units 6-1, 6-2. In the case where the calculated $\Delta SOC$ is smaller than a predetermined threshold Sth, power storage unit control unit 562 selects, as the power storage unit used after present activation, a sub power storage unit different from the power storage unit used after preceding activation as read from memory unit 560. In the case where the calculated $\Delta SOC$ is equal to or larger than predetermined threshold Sth, power storage unit control unit 562 selects, as the power storage unit used after present activation, a sub power storage unit with a higher SOC from sub power storage units 6-1, 6-2, regardless of which sub power storage unit was the power storage unit used after preceding activation. In this way, it can be surely prevented that a sub power storage unit with a high SOC is left as it is.

Then, power storage unit control unit 562 generates signals SE1, SE2 for making switch circuits SW1, SW2 (FIG. 1) electrically conductive or non-conductive so that the selected sub power storage unit is electrically connected to converter 8-2 (FIG. 1), and outputs the generated signals SE1, SE2 to switch circuits SW1, SW2 and drive signal generation unit 62 (FIG. 6).

In this way, after the present activation of the vehicle system, the sub power storage unit selected by power storage unit control unit 562 is used first. After SOC of this sub power storage unit reaches lower limit SL, the other sub power storage unit is used.

Further, power storage unit control unit 562 updates, when the present operation of the vehicle system is ended, the power storage unit used after preceding activation as stored in memory unit 560, to the sub power storage unit used first after the vehicle system is activated. Thus, the sub power storage unit used first after the present activation of the vehicle system will be used as the power storage unit used after preceding activation, in selecting the sub power storage unit to be used after the next activation of the vehicle system.

At this time, power storage unit control unit 562 updates the power storage unit used after preceding activation as stored in memory unit 560, when the vehicle control mode is executed after activation of the vehicle system as shown in FIG. 10. In contrast, when the external charging mode is executed after activation of the vehicle system, the power storage unit used after preceding activation as stored in memory unit 560 is not updated but maintained. The determination about whether the travel control mode is executed or external charging mode is executed after activation of the vehicle system is made based on signal IG indicating the operating state (ON/OFF state) of the ignition switch and signal CON indicating the state of coupling between an external power supply and charge connector 40 (FIG. 7).

FIG. 10 is a diagram for illustrating the concept regarding control of switching between sub power storage units 6-1, 6-2 to be used, according to an embodiment of the present invention.

Referring to FIG. 10, the ignition switch is made ON at time t10. In response to this, the vehicle system is activated (hereinafter also referred to as "IG ON state"). Then, the vehicle is set to the travel control mode. In the example of FIG. 10, first sub power storage unit 6-1 is used first after the vehicle system is activated.

Since it is preferable in this travel control mode that the vehicle is running while the engine is stopped as long as possible, one of EV (Electric Vehicle) travel mode and HV (Hybrid Vehicle) travel mode is selected for allowing the vehicle to travel Specifically, in the EV travel mode, the vehicle runs using only the drive force from second motor generator MG2 in principle, until SOCs of main power storage unit 6-0 and sub power storage units 6-1, 6-2 become smaller than lower limit SL (FIG. 4). In this EV travel mode, motor generator MG1 does not generate electric power from the drive force from the engine, and the internal charging for main power storage unit 6-0 and sub power storage units 6-1, 6-2 is restricted. An object of the EV travel mode is to improve the fuel consumption efficiency with the engine stopped. The engine, however, may be started in such cases where the driver makes a drive force request such as request for rapid acceleration, where the catalyst is warmed up, where the driver makes a request irrelevant of the drive force request, such as a request for air conditioning, and where other conditions are satisfied, for example.

When respective SOCs of main power storage unit 6-0 and sub power storage units 6-1, 6-2 become smaller than lower limit SL in the EV travel mode, the travel mode changes to the HV travel mode. In the HV travel control mode, the electric power generation by first motor generator MG1 in the vehicle is controlled such that all of respective SOCs of main power storage unit 6-0 and sub power storage units 6-1, 6-2 are kept within the predetermined range defined by upper limit SH and lower limit SL (FIG. 4). In response to the electric power generation of first motor generator MG1, the operation of the engine is also started. A part of the drive force generated from the operation of the engine is also used for causing the vehicle to travel.

At time t11, the ignition switch is turned off. In response to this, the vehicle enters the IG OFF state. In the period before time t12 when the vehicle system is stopped, the vehicle is set to an offset acquisition mode. In the offset acquisition mode, an error is obtained that is included in each of respective detected values of input/output current detection unit 16, input/output voltage detection unit 18, charge/discharge current detection units 10-0, 10-1, 10-2, and charge/discharge voltage detection units 12-0, 12-1, 12-2. The detected value of the relevant detection unit is offset by the obtained error so as to correct the detection value of the detection unit.

In the offset acquisition mode, power storage unit control unit 562 of power storage unit switching unit 56 selects a sub power storage unit as the power storage unit to be used after present activation, based on the power storage unit used after preceding activation as read from memory unit 560 and respective SOCs of sub power storage units 6-1, 6-2, according to the above-described method. In the offset acquisition mode, the present power storage unit to be used after activation is determined in advance. Accordingly, the period from the IG ON state to the state where the vehicle is allowed to travel (READY ON state) can be shortened.

As shown in FIG. 10, power storage unit control unit 562 updates the power storage unit used after preceding activation as stored in memory unit 560, before selecting the sub power storage unit. Specifically, when the travel control mode comes to the end, power storage unit control unit 562 updates the power storage unit used after preceding activation to first sub power storage unit 6-1 used first after the vehicle system is activated in this travel control mode.

Thus, in selection of the sub power storage unit, first sub power storage unit 6-1 is read from memory unit 560 as updated as the power storage unit used after preceding activation. Based on the power storage unit used after preceding activation and respective SOCs of sub power storage units 6-1, 6-2, power storage unit control unit 562 selects second sub power storage unit 6-2 as the power storage unit used after present activation.

Then, at time t13, the vehicle enters the connector ON state. In response to this, the vehicle system is activated and the vehicle is set to the external charging mode. In the external charging mode, main power storage unit 6-0 and sub power storage units 6-1, 6-2 are charged by an external power supply so that respective SOCs are within the predetermined ranges set in advance.

At time t14, the vehicle is disconnected from the external power supply (hereinafter also referred to as "connector OFF state"). Then, in the period before time t15 when the vehicle system is stopped, the vehicle is set to the offset acquisition mode.

In the offset acquisition mode, power storage unit control unit 562 selects one of the sub power storage units as the power storage unit used after present activation, based on the power storage unit used after preceding activation as read from memory unit 560 and respective SOCs of sub power storage units 6-1, 6-2, according to the above-described method.

Until the sub power storage unit is selected, power storage unit control unit 562 does not update the power storage unit used after preceding activation as stored in memory unit 560. Specifically, when the external charging mode comes to the end, power storage unit control unit 562 does not update the power storage unit used after preceding activation but maintains the power storage unit used after preceding activation (first sub power storage unit 6-1) as stored in memory unit 560.

Thus, in selection of the sub power storage unit, first sub power storage unit 6-1 is read from memory unit 560 as the power storage unit used after preceding activation. Based on the power storage unit used after preceding activation and respective SOCs of sub power storage units 6-1, 6-2, power storage unit control unit 562 selects second sub power storage unit 6-2 as the power storage unit to be used after present activation.

At time t16, the vehicle enters the IG ON state. Then, the vehicle is set to the travel control mode. In the example of FIG. 10, second sub power storage unit 6-2 selected as the power storage unit used after present activation is used first after the vehicle system is activated. When the vehicle enters the IG OFF state and the travel control mode is ended (time t17), power storage unit control unit 562 updates the power storage unit used after preceding activation to second sub power storage unit 6-2 used first after the vehicle system is started in the travel control mode. Accordingly, in the offset acquisition mode from time t17 to time t18 when the vehicle system is stopped, second sub power storage unit 6-2 is read from memory unit 560 as the power storage unit used after preceding activation. Based on the power storage unit used after preceding activation and respective SOCs of sub power storage units 6-1, 6-2, power storage unit control unit 562 selects first sub power storage unit 1-1 as the power storage unit used after present activation.

As described above, when the travel control mode is performed after the vehicle system is activated, the power storage unit used after preceding activation in memory unit 560 is updated. In contrast, when the external charging mode is performed after the vehicle system is activated, the power storage unit used after preceding activation in memory unit 560 is not updated but maintained, so that the sub power storage unit used first in the preceding power control mode is always stored. Accordingly, in the present travel control mode, the sub power storage unit different from the sub power storage unit used first in the preceding travel control mode can be used first. In this way, the situation where a specific sub power storage unit is used first after the vehicle system is activated can be avoided, so that a difference in degree of deterioration between the sub power storage units can be suppressed.

Regarding the control of switching of sub power storage units 6-1, 6-2 to be used, the structure has been illustrated where the power storage unit used after preceding activation as stored in memory unit 560 is updated in response to the execution of the travel control mode after the vehicle system is activated. Alternatively, in response to the confirmation that sub power storage units 6-1, 6-2 are used after the vehicle system is activated, the power storage unit used after preceding activation may be updated. For example, the power storage unit used after preceding activation may be updated in response to the detection of discharging from one of sub power storage units 6-1, 6-2 based on the outputs from charge/discharge current detection units 10-1, 10-2 (FIG. 1) after the vehicle system is activated.

FIG. 11 is a flowchart for illustrating a control structure of power storage unit switching unit 56 in converter ECU 2 of FIG. 5. Each step shown in FIG. 11 is implemented by power storage unit switching unit 56 in converter ECU 2 (FIG. 5) functioning as each control block shown in FIG. 9.

Referring to FIG. 11, power storage unit switching unit 56 functioning as power storage unit control unit 562 determines whether or not the travel control mode is ended, based on signal IG indicating the operating state (ON/OFF state) of the ignition switch (step S01). When the vehicle is in the IG OFF state, power storage unit control unit 562 determines that the travel control mode is ended (YES in step S01), and updates the power storage unit used after preceding activation as stored in memory unit 560 to the sub power storage unit used first after the vehicle system is activated in the present travel control mode (present power storage unit used after activation) (step S02).

In contrast, when the travel control mode is not ended (NO in step S01), power storage unit control unit 562 further determines whether or not the external charging mode is ended (step S03). When the vehicle is in the connector OFF state, power storage unit control unit 562 determines that the external charging mode is ended (YES in step S03). In this case, power storage unit control unit 562 does not update the power storage unit used after preceding activation as stored in memory unit 560, and proceeds to step S04.

When the external charging mode is not ended (NO in step S03), the process for the switching of the power storage unit to be used is ended.

When the travel control mode is ended, or the external charging mode is ended, the vehicle is set to the offset acquisition mode. In the offset acquisition mode, power storage unit control unit 562 selects one of sub power storage units 6-1, 6-2 as the power storage unit used after present activation.

Specifically, power storage unit control unit 562 reads from memory unit 560 the power storage unit used after preceding activation (step S04), and obtains from battery ECU 4 (FIG. 1) SOC (SOC_s1, SOC_s2) of sub power storage units 6-1, 6-2 (step S05). Then, power storage unit control unit 562 calculates the difference between respective SOCs of sub power storage units 6-1, 6-2, namely $\Delta SOC(=|SOC\_s1-SOC\_s2|)$, and determines whether or not the calculated $\Delta SOC$ is smaller than predetermined threshold Sth (step S06).

When $\Delta SOC$ is smaller than predetermined threshold (YES in step S06), power storage unit control unit 562 selects the sub power storage unit different from the power storage unit used after preceding activation as read from memory unit 560, as the power storage unit used after present activation (step S07).

When $\Delta SOC$ is equal to or larger than threshold Sth (NO in step S06), power storage unit control unit 562 selects, from sub power storage units 6-1, 6-2, a sub power storage unit having a higher SOC, as the power storage unit used after present activation, regardless of the power storage unit used after preceding activation (step S08).

Then, based on signal IG, power storage unit control unit 562 determines whether or not the travel control mode is started (step S09).

When the vehicle is in the IF OFF state or connector OFF state, it is determined that the travel control mode is not started (NO in step S09), and the process returns to the start of step S09.

When the vehicle is in the IG ON state, power storage unit control unit 562 determines that the travel control mode is started (YES in step S09), and controls the switching of the power storage unit to be used (step S10).

Specifically, power storage unit control unit 562 generates signals SE1, SE2 for making switch circuits SW1, SW2 (FIG. 1) electrically conductive or non-conductive so that the sub power storage unit selected in step S07 or S08 is electrically connected to converter 8-2 (FIG. 1). Power storage unit control unit 562 then outputs the generated signals SE1, SE2 to switch circuits SW1, SW2 and drive signal generation unit 62 (FIG. 6).

Following the concept as illustrated in FIGS. 3 and 4, converter ECU 2 controls electric power sharing between main power storage unit 6-0 and sub power storage units 6-1, 6-2. At this time, in the sub power storage device, the sub power storage unit selected in step S07 or S08 is used first and the other sub power storage unit is subsequently used after SOC_s1 of the sub power storage unit reaches lower limit SL.

Regarding the correspondence between the embodiments of the present invention and the claimed invention, sub power storage units 6-1, 6-2 correspond to "a plurality of power storage units," drive force generation unit 3 corresponds to "load device," main positive line MPL and main negative line MNL correspond to "electric power line," and converters 8-1, 8-2 correspond to "voltage conversion unit." Further, "travel control mode" corresponds to "first control mode" and "external charging mode" corresponds to "second control mode." Converter ECU 2 implements "memory unit," "power storage unit selection unit," "power storage unit switch unit" and "update unit."

While the description above illustrates the power supply system where the sub power storage device is constituted of two sub power storage units, the present invention is also applicable to a power supply system including a sub power storage device constituted of three or more sub power storage units.

As heretofore described, according to the embodiments of the present invention, the power storage unit used after preceding activation as stored in the memory unit is updated when the travel control mode is performed after the vehicle system is activated. In contrast, when the external charging mode is performed after the vehicle system is activated, the power storage unit used after preceding activation as stored in the memory unit is not updated but maintained. Thus, the memory unit always stores the sub power storage unit that is used first when the preceding travel control mode is executed. Therefore, when the present travel control mode is performed, a sub power storage unit can be used first that is different from the sub power storage unit used first when the preceding travel control mode is performed. Accordingly, the situation can be avoided where a specific power storage unit is always used first after the vehicle system is activated, and a difference in degree of deterioration between the sub power storage units can be suppressed.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A power supply system for supplying electric power to a load device, said power supply system comprising:
   a power storage mechanism configured to be chargeable and dischargeable; and
   a control device configured to activate said power supply system for executing one of a first control mode and a second control mode when said power supply system is set to said one of the first control mode and the second control mode, said first control mode being executed for supplying and receiving electric power between said power storage mechanism and said load device, and said second control mode being executed for externally charging said power storage mechanism with electric power received from an external power supply,
   said power storage mechanism including a plurality of power storage units each being chargeable and dischargeable and connected in parallel to said load device,
   said control device including:
      a memory unit for storing a history of use of said plurality of power storage units; and
      a power storage unit selection unit for selecting, from said plurality of power storage units, a power storage unit to be used first after activation of said power supply system, based on the history of use of said plurality of power storage units,
   said power storage unit selection unit reading from said memory unit information about a power storage unit used first after preceding activation of said power supply system and, based on said read information, selecting a power storage unit to be used first after present activation of said power supply system, and
   said control device further including an update unit configured to update, when said power supply system has been activated for executing said first control mode, said information about the power storage unit used first after the preceding activation of said power supply system as stored in said memory unit, to information about a power storage unit used first after the present activation of said power supply system, and to maintain, when said power supply system has been activated for executing said second control mode, said information about the power storage unit used first after the preceding activation of said power supply system as stored in said memory unit.

2. The power supply system according to claim 1, wherein said control device further includes a state estimation unit for estimating a value of state of charge of each of said plurality of power storage units, and
   based on the history of use of said plurality of power storage units and the value of state of charge of said plurality of power storage units, said power storage unit selection unit selects, from said plurality of power storage units, the power storage unit to be used first after the present activation of said power supply system.

3. The power supply system according to claim 2, wherein when a difference between respective values of state of charge of said plurality of power storage units is larger than a predetermined value, said power storage unit selection unit selects a power storage unit having a largest value of state of charge as the power storage unit to be used first after the present activation of said power supply system and, when said difference is not larger than said predetermined value, said power storage unit selection unit selects a power storage unit different from the power storage unit used first after the preceding activation of said power supply system, as the power storage unit to be used first after the present activation of said power supply system.

4. The power supply system according to claim 1, wherein said power storage unit selection unit selects the power storage unit to be used first after the present activation of said power supply system, after the preceding activation of said power supply system and when execution of said control mode to which said power supply system is set is ended.

5. The power supply system according to claim 1, further comprising:
   an electric power line configured to allow electric power to be supplied and received between said load device and said power supply system; and
   a voltage conversion unit provided between said power storage mechanism and said electric power line for making voltage conversion between said power storage mechanism and said electric power line, wherein
   said control device further includes a voltage conversion control unit configured to control the voltage conversion by said voltage conversion unit such that electric power is supplied and received between said power storage mechanism and said load device or said external power supply according to said control mode to which said power supply system is set.

6. The power supply system according to claim 1, wherein said power storage mechanism further includes a switch mechanism for selecting one of said plurality of power storage units and connecting the selected power storage unit to said load device, and
   said control device further includes a power storage unit switch unit for controlling said switch mechanism such that said power storage unit selected by said power storage unit selection unit and said load device are electrically connected.

7. A vehicle comprising:
   a power supply system for supplying electric power to a load device; and
   a drive force generation unit configured as said load device to generate drive force for the vehicle from electric power received from said power supply system,
   said power supply system including:
   a power storage mechanism configured to be chargeable and dischargeable; and
   a control device configured to activate said power supply system for executing one of a first control mode and a second control mode when said power supply system is set to said one of the first control mode and the second control mode, said first control mode being executed for supplying and receiving electric power between said power storage mechanism and said load device, and said second control mode being executed for externally charging said power storage mechanism with electric power received from an external power supply,
   said power storage mechanism including a plurality of power storage units each being chargeable and dischargeable and connected in parallel to said load device, said control device including:
  a memory unit for storing a history of use of said plurality of power storage units; and
  a power storage unit selection unit for selecting, from said plurality of power storage units, a power storage unit to be used first after activation of said power supply system, based on the history of use of said plurality of power storage units,
said power storage unit selection unit reading from said memory unit information about a power storage unit used first after preceding activation of said power supply system and, based on said read information, selecting a power storage unit to be used first after present activation of said power supply system, and
said control device further including an update unit configured to update, when said power supply system has been activated for executing said first control mode, said information about the power storage unit used first after the preceding activation of said power supply system as stored in said memory unit, to information about a power storage unit used first after the present activation of said power supply system, and to maintain, when said power supply system has been activated for executing said second control mode, said information about the power storage unit used first after the preceding activation of said power supply system as stored in said memory unit.

8. A control method for a power supply system for supplying electric power to a load device,
said power supply system having a power storage mechanism including a plurality of power storage units each being chargeable and dischargeable and connected in parallel to said load device,
said control method comprising the steps of:
  setting said power supply system to one of a first control mode and a second control mode, and activating said power supply system for executing said one of the first control mode and the second control mode to which said power supply system is set, said first control mode being executed for supplying and receiving electric power between said power storage mechanism and said load device, and said second control mode being executed for externally charging said power storage mechanism with electric power received from an external power supply;
  storing a history of use of said plurality of power storage units in a memory unit; and
  selecting, from said plurality of power storage units, a power storage unit to be used first after activation of said power supply system, based on the history of use of said plurality of power storage units,
said step of selecting one power storage unit including reading from said memory unit information about a power storage unit used first after preceding activation of said power supply system and, based on said read information, selecting a power storage unit to be used first after present activation of said power supply system, and
said control method further comprising the step of updating, when said power supply system has been activated for executing said first control mode, said information about the power storage unit used first after the preceding activation of said power supply system as stored in said memory unit, to information about a power storage unit used first after the present activation of said power supply system, and maintaining, when said power supply system has been activated for executing said second control mode, said information about the power storage unit used first after the preceding activation of said power supply system, as stored in said memory unit.

9. The control method for a power supply system according to claim 8, wherein
  said control method further comprises the step of estimating a value of state of charge of each of said plurality of power storage units, and
  in said step of selecting one power storage unit, based on the history of use of said plurality of power storage units and the value of state of charge of said plurality of power storage units each, the power storage unit to be used first after the present activation of said power supply system is selected from said plurality of power storage units.

10. The control method for a power supply system according to claim 9, wherein
  in said step of selecting one power storage unit, when a difference between respective values of state of charge of said plurality of power storage units is larger than a predetermined value, a power storage unit having a largest value of state of charge is selected as the power storage unit to be used first after the present activation of said power supply system and, when said difference is not larger than said predetermined value, a power storage unit different from the power storage unit used first after the preceding activation of said power supply system is selected as the power storage unit to be used first after the present activation of said power supply system.

11. The control method for a power supply system according to claim 8, wherein
  in said step of selecting one power storage unit, the power storage unit to be used first after the present activation of said power supply system is selected after the preceding activation of said power supply system and when execution of said control mode to which said power supply system is set is ended.

12. The control method for a power supply system according to claim 8, wherein
  said power supply system further includes:
  an electric power line configured to allow electric power to be supplied and received between said load device and said power supply system; and
  a voltage conversion unit provided between said power storage mechanism and said electric power line for making voltage conversion between said power storage mechanism and said electric power line, and
  said control method further comprises the step of controlling the voltage conversion by said voltage conversion unit such that electric power is supplied and received between said power storage mechanism and said load device or said external power supply according to said control mode to which said power supply system is set.

13. The control method for a power supply system according to claim 8, wherein
  said power storage mechanism further includes a switch mechanism for selecting one of said plurality of power storage units and connecting the selected power storage unit to said load device, and
  said control method further comprises the step of controlling said switch mechanism such that said power storage unit selected by said step of selecting one power storage unit and said load device are electrically connected.

* * * * *

UNITED STATES PATENT AND TRADEMARK OFFICE
CERTIFICATE OF CORRECTION

PATENT NO.        : 8,049,367 B2                                         Page 1 of 1
APPLICATION NO.   : 12/506294
DATED             : November 1, 2011
INVENTOR(S)       : Junta Izumi et al.

It is certified that error appears in the above-identified patent and that said Letters Patent is hereby corrected as shown below:

At column 11, line number 62 after (SOC_m delete "_" and insert -- — --.

Signed and Sealed this
Sixth Day of November, 2012

David J. Kappos
*Director of the United States Patent and Trademark Office*